(12) United States Patent
Petersen

(10) Patent No.: US 12,063,309 B2
(45) Date of Patent: Aug. 13, 2024

(54) DECENTRALIZED DATA VERIFICATION

(71) Applicant: The Assay Depot, Inc., Solana Beach, CA (US)

(72) Inventor: Christopher L. Petersen, Coronado, CA (US)

(73) Assignee: The Assay Depot, Inc., Solana Beach, CA (US)

( * ) Notice: Subject to any disclaimer, the term of this patent is extended or adjusted under 35 U.S.C. 154(b) by 870 days.

(21) Appl. No.: 17/050,398

(22) PCT Filed: Apr. 25, 2019

(86) PCT No.: PCT/US2019/029227
§ 371 (c)(1),
(2) Date: Jan. 14, 2021

(87) PCT Pub. No.: WO2020/036657
PCT Pub. Date: Feb. 20, 2020

(65) Prior Publication Data
US 2021/0075623 A1    Mar. 11, 2021

Related U.S. Application Data

(60) Provisional application No. 62/663,133, filed on Apr. 26, 2018.

(51) Int. Cl.
*H04L 29/00* (2006.01)
*G06Q 20/40* (2012.01)
*H04L 9/06* (2006.01)
*H04L 9/32* (2006.01)

(52) U.S. Cl.
CPC ......... *H04L 9/3242* (2013.01); *G06Q 20/401* (2013.01); *H04L 9/0637* (2013.01); *G06Q 2220/00* (2013.01)

(58) Field of Classification Search
CPC ... H04L 9/3242; H04L 9/0637; G06Q 20/401; G06Q 2220/00
USPC .......................................................... 713/168
See application file for complete search history.

(56) References Cited

U.S. PATENT DOCUMENTS

| 2017/0111175 | A1  | 4/2017 | Oberhauser et al. |
| 2017/0161439 | A1  | 6/2017 | Raduchel et al. |
| 2017/0232300 | A1* | 8/2017 | Tran ........................ G06F 1/163 434/247 |
| 2017/0236123 | A1  | 8/2017 | Ali et al. |

(Continued)

FOREIGN PATENT DOCUMENTS

WO    WO-2020036657 A1    2/2020

OTHER PUBLICATIONS

Lien et al. Open source tools for standardized privacy protection of medical images. Proc. SPIE 7967, Medical Imaging 2011: Advanced PACS-based Imaging Informatics and Therapeutic Applications, 79670M (Mar. 24, 2011).

(Continued)

*Primary Examiner* — Jeffrey C Pwu
*Assistant Examiner* — Michael D Anderson
(74) *Attorney, Agent, or Firm* — Wilson Sonsini Goodrich & Rosati

(57) ABSTRACT

Provided herein are methods, systems, and media that leverage blockchain technology and cryptography implemented on decentralized or distributed peer-to-peer networks to provide reliable and secure verification of data integrity.

20 Claims, 9 Drawing Sheets

(56) References Cited

U.S. PATENT DOCUMENTS

2017/0257358 A1 9/2017 Ebrahimi et al.
2017/0366353 A1 12/2017 Struttmann

OTHER PUBLICATIONS

PCT/US2019/029227 International Search Report and Written Opinion dated Jan. 29, 2020.
EP19850101.7 Extended European Search Report dated Dec. 21, 2021.

* cited by examiner

DECENTRALIZED DATA VERIFICATION

CROSS-REFERENCE

This patent application is a 371 National Stage Entry of International Application No. PCT/US2019/029227, filed Apr. 25, 2019, which claims the benefit of U.S. Provisional Application Ser. No. 62/663,133, filed Apr. 26, 2018, each of which is incorporated herein by reference in its entirety.

BACKGROUND

Electronic data and document storage is traditionally carried out using centralized servers in the cloud and/or locally saved files. In some instances, sensitive electronic files must be verified to ensure data integrity and absence of tampering. Traditional systems utilize electronic notarization and/or digital signatures. For example, electronic lab notebooks typically require validation in the form of an electronic signature in order to certify their contents. However, centralized servers are vulnerable to hacking, while locally saved files can also be hacked, lost, or destroyed.

SUMMARY

There is a long-felt and unmet need for a system that provides data integrity and verification for electronic files or documents without relying on centralized or localized data storage. A decentralized system for ensuring the integrity of electronic information is useful for various data such as structured data, electronic lab notebooks or notebook entries, PDF files, electronic medical records (EMRs) or electronic health records (EHRs), and audits.

One advantage of the present disclosure is the ability to guarantee the immutability of the data through an immutable, shared ledger of transactions (e.g. the blockchain). Transactions are stored on a sequence of blocks on the blockchain. A hashing function is used to generate a unique hash for the contents of each block, which can be stored on the block and a next block, thus linking the blocks via their hashes. An alteration to the contents of a particular block will result in a different hash produced using that same hash function. As a result, the immutability of data in a series of blocks can be verified through the hashing function. In addition, the decentralized nature of the nodes allows a consensus to be achieved for a new block added to the blockchain without relying on a single, centralized authority that may be vulnerable to hacking.

Another advantage of the present disclosure is the ability to verify, manage, and/or share data such as electronic lab notebooks, electronic medical records, transactions (e.g., purchase orders), shipping or compliance documents, and other confidential information while maintaining robust privacy protections. Data verification can be performed through blockchain technology without placing the data itself in the public sphere. Data sharing and/or management can be conducted through secured portals using encryption mechanisms described herein.

In some aspects, disclosed herein are platforms, systems, devices, media, and methods utilizing blockchain technology to provide data integrity and verification for electronic files or documents. Blockchain-based platforms can be used for various applications such as cryptocurrencies, smart contracts, insurance, and online voting. An exemplary cryptocurrency, Bitcoin, utilizes cryptography on a peer-to-peer (P2P) network of nodes to carry out and verify transactions, which are recorded on a public distributed ledger or blockchain. Non-limiting examples of cryptocurrencies and other blockchain-based applications include Ethereum, Cardano, MultiChain, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash.

Disclosed herein is a computer-implemented method for data certification using a distributed blockchain computing network, the method comprising: a) providing tools to a user to generate a profile; b) linking the profile to at least one data verification blockchain; c) providing an interface for uploading at least one data unit for certification and verification; d) processing the at least one data unit to generate an encrypted data structure and storing the encrypted data structure; e) generating a first hash of the at least one data unit using a cryptographic hash function; f) publishing a new transaction comprising the first hash of the data to a distributed blockchain computing network for validation and addition to the at least one data verification blockchain within a new block; g) receiving a request for certification of the at least one data unit; h) retrieving and decrypting the encrypted data structure data to obtain decrypted data for verification; i) hashing the decrypted data using the cryptographic hash function to generate a second hash; j) identifying the new block comprising the new transaction and extracting the first hash from the new block; k) comparing the first hash with the second hash to verify whether the at least one data unit is unaltered; and l) issuing a certification of the at least one data unit upon verifying the at least one data unit is unaltered. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the at least one data unit comprises an electronic lab notebook or entry, electronic health record, structured data, log entry, supplier audit information, electronic file, statement of work, signed legal document, compliance manifest, supplier RFI or a portion thereof. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the method further comprises transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the encrypted data structure comprises electronic health records. In some embodiments, the encrypted data structure comprises at least one entry of an electronic lab notebook. In some embodiments, the new block comprises a hash of a previous block on the blockchain, a consensus proof, a timestamp, transaction information, or a combination thereof. In some embodiments, the method further comprising: a) receiving authorization from the user to share the encrypted data structure with an intended recipient; b) decrypting the encrypted data structure to obtain the at least one data unit using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network. In some embodiments, the at least one data unit is anonymized to remove identifying information. Disclosed herein is a computer-implemented method for data certification using a distributed blockchain computing network, the method comprising: a) providing an interface for uploading at least one data unit for certification and verification; b) processing the at least one data unit to generate an encrypted data structure and storing the encrypted data structure; c) generating a first hash of the at least one data unit using a cryptographic hash function; d) publishing a new transaction comprising the first hash of the data to a distributed blockchain computing network for validation and addition to the at least one data verification blockchain within a new block; e) receiving a request for certification of the at least one data unit; f) retrieving and decrypting the encrypted data structure data to obtain decrypted data for verification; g) hashing the decrypted data using the cryptographic hash function to generate a second hash; h) identifying the new block comprising the new transaction and extracting the first hash from the new block; i) comparing the first hash with the second hash to verify whether the at least one data unit is unaltered; and j) issuing a certification of the at least one data unit upon verifying the at least one data unit is unaltered.

Disclosed herein is a distributed peer-to-peer computer network for data certification using blockchain, the network comprising: a) a plurality of computing devices, each said computing device comprising at least one processor, a memory, and an operating system, wherein the plurality of the computing devices communicates based on a peer-to-peer protocol; wherein one of said computing devices is configured for: b) providing tools to a user to generate a profile; c) linking the profile to at least one data verification blockchain; d) providing an interface for uploading at least one data unit for certification and verification; e) processing the at least one data unit to generate an encrypted data structure and storing the encrypted data structure; f) generating a first hash of the at least one data unit using a cryptographic hash function; g) publishing a new transaction comprising the first hash of the data to the network for validation and addition to the at least one data verification blockchain within a new block; h) receiving a request for certification of the at least one data unit; i) retrieving and decrypting the encrypted data structure data to obtain decrypted data for verification; j) hashing the decrypted data using the cryptographic hash function to generate a second hash; k) identifying the new block comprising the new transaction and extracting the first hash from the new block; l) comparing the first hash with the second hash to verify whether the at least one data unit is unaltered; and m) issuing a certification of the at least one data unit upon verifying the at least one data unit is unaltered. In some embodiments, the data verification blockchain is selected from a plurality of blockchains on the network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the network is a private decentralized peer-to-peer network. In some embodiments, the network is a public decentralized peer-to-peer network. In some embodiments, the at least one data unit comprises an electronic lab notebook or entry, electronic health record, structured data, log entry, supplier audit information, electronic file, statement of work, signed legal document, compliance manifest, supplier RFI or a portion thereof. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, one of said computing devices is further configured for transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the encrypted data structure comprises electronic health records. In some embodiments, the encrypted data structure comprises at least one entry of an electronic lab notebook. In some embodiments, the new block comprises a hash of a previous block on the blockchain, a consensus proof, a timestamp, transaction information, or a combination thereof. In some embodiments, the network further comprising: a) receiving authorization from the user to share the encrypted data structure with an intended recipient; b) decrypting the encrypted data structure to obtain the data using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on the network. In some embodiments, the network is a private decentralized peer-to-peer network. In some embodiments, the network is a public decentralized peer-to-peer network. In some embodiments, the at least one data unit is anonymized to remove identifying information. A distributed peer-to-peer computer network for data certification using blockchain, the network comprising: a) a plurality of computing devices, each said computing device comprising at least one processor, a memory, and an operating system, wherein the plurality of the computing devices communicates based on a peer-to-peer protocol; wherein one of said computing devices is configured for: a) providing an interface for uploading at least one data unit for certification and verification; b) processing the at least one data unit to generate an encrypted data structure and storing the encrypted data structure; c) generating a first hash of the at least one data unit using a cryptographic hash function; d) publishing a new transaction comprising the first hash of the data to a distributed blockchain computing network for validation and addition to the at least one data verification blockchain within a new block; e) receiving a request for certification of the at least one data unit; f) retrieving and decrypting the encrypted data structure data to obtain decrypted data for verification; g) hashing the decrypted data using the cryptographic hash function to generate a second hash; h) identifying the new block comprising the new transaction and extracting the first hash from the new block; i) comparing the first hash with the second hash to verify whether the at least one data unit is unaltered; and j) issuing a certification of the at least one data unit upon verifying the at least one data unit is unaltered.

Disclosed herein is a non-transitory computer readable media storing machine readable instructions executable by at least one processor to create an application for certifying data using blockchain, the application comprising: a) a software module providing tools to a user to generate a profile; b) a software module linking the profile to at least one data verification blockchain; c) a software module providing an interface for uploading at least one data unit for certification and verification; d) a software module processing the at least one data unit to generate an encrypted data structure and storing the encrypted data structure; e) a software module generating a first hash of the at least one data unit using a cryptographic hash function; f) a software module publishing a new transaction comprising the first hash of the data to a distributed blockchain computing network for validation and addition to the at least one data verification blockchain within a new block; g) a software module receiving a request for certification of the at least one data unit; h) a software module retrieving and decrypting the encrypted data structure data to obtain decrypted data for verification; i) a software module hashing the decrypted data using the cryptographic hash function to generate a second hash; j) a software module identifying the new block comprising the new transaction and extracting the first hash from the new block; k) a software module comparing the first hash with the second hash to verify whether the at least one data unit is unaltered; and l) a software module issuing a certification of the at least one data unit upon verifying the at least one data unit is unaltered. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the at least one data unit comprises an electronic lab notebook or entry, electronic health record, structured data, log entry, supplier audit information, electronic file, statement of work, signed legal document, compliance manifest, supplier RFI or a portion thereof. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the media further comprises a software module transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the encrypted data structure comprises electronic health records. In some embodiments, the encrypted data structure comprises at least one entry of an electronic lab notebook. In some embodiments, the new block comprises a hash of a previous block on the blockchain, a consensus proof, a timestamp, transaction information, or a combination thereof. In some embodiments, the application further comprising: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on a private decentralized peer-to-peer network. In some embodiments, the data storage blockchain is published on a public decentralized peer-to-peer network. In some embodiments, the at least one data unit is anonymized to remove identifying information. Disclosed herein is a non-transitory computer readable media storing machine readable instructions executable by at least one processor to create an application for certifying data using blockchain, the application comprising: a) a plurality of computing devices, each said computing device comprising at least one processor, a memory, and an operating system, wherein the plurality of the computing devices communicates based on a peer-to-peer protocol; wherein one of said computing devices is configured for: a) providing an interface for uploading at least one data unit for certification and verification; b) processing the at least one data unit to generate an encrypted data structure and storing the encrypted data structure; c) generating a first hash of the at least one data unit using a cryptographic hash function; d) publishing a new transaction comprising the first hash of the data to a distributed blockchain computing network for validation and addition to the at least one data verification blockchain within a new block; e) receiving a request for certification of the at least one data unit; f) retrieving and decrypting the encrypted data structure data to obtain decrypted data for verification; g) hashing the decrypted data using the cryptographic hash function to generate a second hash; h) identifying the new block comprising the new transaction and extracting the first hash from the new block; i) comparing the first hash with the second hash to verify whether the at least one data unit is unaltered; and j) issuing a certification of the at least one data unit upon verifying the at least one data unit is unaltered.

Disclosed herein is a computer-implemented method for managing an electronic lab notebook using a distributed blockchain computing network, the method comprising: a) providing an electronic lab notebook enabling a user to enter, edit, and upload entries; b) obtaining at least one electronic lab notebook entry comprising one or more data units for uploading; c) identifying and accessing a data verification blockchain linked to the electronic lab notebook; d) processing the electronic lab notebook entry to generate an encrypted data structure and uploading the encrypted data structure onto a secured database; e) generating a first hash of the electronic lab notebook entry using a cryptographic hash function; and f) publishing a new transaction comprising the first hash of the data to a distributed blockchain computing network for validation and addition to the at least one data verification blockchain within a new block, said new transaction comprising the hash of the electronic lab notebook entry, a digital signature of the hash created using a private key of a cryptographic key pair, and a public key of the cryptographic key pair. In some embodiments, the method further comprises verifying the electronic lab notebook entry by decrypting the encrypted data structure and comparing a second hash of the decrypted data structure with the first hash. In some embodiments, the electronic lab notebook is provided through a local software application on a local computing device of the user. In some embodiments, the electronic lab notebook is accessed through an online web portal. In some embodiments, the at least one entry is automatically uploaded for storage on the secured database. In some embodiments, the at least one entry is automatically uploaded for verification on the data verification blockchain. In some embodiments, the data verification blockchain is selected from a plurality of blockchains on the distributed blockchain computing network. In some embodiments, the distributed blockchain computing network is a private decentralized peer-to-peer network. In some embodiments, the distributed blockchain computing network is a public decentralized peer-to-peer network. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the method further comprises transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the new block comprises a hash of a previous block on the blockchain, a consensus proof, a timestamp, transaction information, or a combination thereof. In some embodiments, the method further comprising: a) receiving authorization from the user to share the encrypted data structure with an intended recipient; b) decrypting the encrypted data structure to obtain the electronic lab notebook entry using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on a private decentralized peer-to-peer network. In some embodiments, the data storage blockchain is published on a public decentralized peer-to-peer network. In some embodiments, the electronic lab notebook entry is anonymized to remove identifying information.

Disclosed here is a non-transitory computer readable media storing machine readable instructions executable by at least one processor to create an electronic lab notebook application utilizing blockchain technology, the application comprising: a) a software module providing an electronic lab notebook enabling a user to enter, edit, and upload entries; b) a software module obtaining at least one electronic lab notebook entry comprising one or more data units for uploading; c) a software module identifying and accessing a data verification blockchain linked to the electronic lab notebook; d) a software module processing the electronic lab notebook entry to generate an encrypted data structure and uploading the encrypted data structure onto a secured database; e) a software module generating a first hash of the electronic lab notebook entry using a cryptographic hash function; and f) a software module publishing a new transaction comprising the first hash of the data to a distributed blockchain computing network for validation and addition to the at least one data verification blockchain within a new block, said new transaction comprising the hash of the electronic lab notebook entry, a digital signature of the hash created using a private key of a cryptographic key pair, and a public key of the cryptographic key pair. In some embodiments, the application further comprises a software module verifying the electronic lab notebook entry by decrypting the encrypted data structure and comparing a second hash of the decrypted data structure with the first hash. In some embodiments, the electronic lab notebook application is a local software application on a local computing device of the user. In some embodiments, the electronic lab notebook application is accessed through an online web portal. In some embodiments, the at least one entry is automatically uploaded for storage on the secured database. In some embodiments, the at least one entry is automatically uploaded for verification on the data verification blockchain. In some embodiments, the data verification blockchain is selected from a plurality of blockchains on the distributed blockchain computing network. In some embodiments, the distributed blockchain computing network is a private decentralized peer-to-peer network. In some embodiments, the distributed blockchain computing network is a public decentralized peer-to-peer network. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the application further comprises a software module transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the new block comprises a hash of a previous block on the blockchain, a consensus proof, a timestamp, transaction information, or a combination thereof. In some embodiments is a non-transitory computer readable media storing machine readable instructions executable by at least one processor to create an electronic lab notebook application utilizing blockchain technology, the application further comprising: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on a private decentralized peer-to-peer network. In some embodiments, the data storage blockchain is published on a public decentralized peer-to-peer network. In some embodiments, the at least one data unit is anonymized to remove identifying information.

Disclosed herein is a computing device in communication with a plurality of computing devices based on a peer-to-peer protocol, said computing device comprising at least one processor, a memory, and a computer program including instructions executable by the at least one processor to create an electronic lab notebook application, the application comprising: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the application further comprises a software module verifying the electronic lab notebook entry by decrypting the encrypted data structure and comparing a second hash of the decrypted data structure with the first hash. In some embodiments, the electronic lab notebook application is a local software application on a local computing device of the user. In some embodiments, the electronic lab notebook application is accessed through an online web portal. In some embodiments, the at least one entry is automatically uploaded for storage on the secured database. In some embodiments, the at least one entry is automatically uploaded for verification on the data verification blockchain. In some embodiments, the data verification blockchain is selected from a plurality of blockchains on the distributed blockchain computing network. In some embodiments, the distributed blockchain computing network is a private decentralized peer-to-peer network. In some embodiments, the distributed blockchain computing network is a public decentralized peer-to-peer network. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the application further comprises a software module transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the new block comprises a hash of a previous block on the blockchain, a consensus proof, a timestamp, transaction information, or a combination thereof. In some embodiments, the application further comprising: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on a private decentralized peer-to-peer network. In some embodiments, the data storage blockchain is published on a public decentralized peer-to-peer network. In some embodiments, the at least one data unit is anonymized to remove identifying information.

Disclosed herein is a computer-implemented method for managing a electronic health records using a distributed blockchain computing network, the method comprising: a) enabling a user or authorized third party to access and upload electronic health records; b) obtaining at least one electronic health record for uploading; c) identifying and accessing a data verification blockchain linked to the user or an identifier thereof; d) processing the at least one electronic health record to generate an encrypted data structure and uploading the encrypted data structure onto a secured database; e) generating a first hash of the at least one electronic health record using a cryptographic hash function; and f) publishing a new transaction comprising the first hash of the data to a distributed blockchain computing network for validation and addition to the at least one data verification blockchain within a new block, said new transaction comprising the hash of the at least one electronic health record, a digital signature of the hash created using a private key of a cryptographic key pair, and a public key of the cryptographic key pair. In some embodiments, the method further comprises verifying the at least one electronic health record by decrypting the encrypted data structure and comparing a second hash of the decrypted data structure with the first hash. In some embodiments, the method further comprises providing tools for the user to grant authorization to one or more third parties to access electronic health records, upload electronic health records, or both. In some embodiments, an authorized third party is a doctor, clinic, hospital, or healthcare provider for the user. In some embodiments, the at least one electronic health record is provided through a local software application on a local computing device of the user. In some embodiments, the at least one electronic health record is accessed through an online web portal. In some embodiments, the at least one electronic health record is automatically uploaded for storage on the secured database. In some embodiments, the data verification blockchain is selected from a plurality of blockchains on the distributed blockchain computing network. In some embodiments, the distributed blockchain computing network is a private decentralized peer-to-peer network. In some embodiments, the distributed blockchain computing network is a public decentralized peer-to-peer network. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the method further comprises transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the new block comprises a hash of a previous block on the blockchain, a consensus proof, a timestamp, transaction information, or a combination thereof.

In some embodiments, the method further comprising: a) receiving authorization from the user to share the encrypted data structure with an intended recipient; b) decrypting the encrypted data structure to obtain the at least one electronic health record using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on a private decentralized peer-to-peer network. In some embodiments, the data storage blockchain is published on a public decentralized peerto-peer network. In some embodiments, the at least one electronic health record is anonymized to remove identifying information.

Disclosed here is a non-transitory computer readable media storing machine readable instructions executable by at least one processor to create a health data management application utilizing blockchain technology, the application comprising: a) a software module enabling a user or authorized third party to access and upload electronic health records; b) a software module obtaining at least one electronic health record for uploading; c) a software module identifying and accessing a data verification blockchain linked to the user or an identifier thereof; d) a software module processing the at least one electronic health record to generate an encrypted data structure and uploading the encrypted data structure onto a secured database; e) a software module generating a first hash of the at least one electronic health record using a cryptographic hash function; and f) a software module publishing a new transaction comprising the first hash of the data to a distributed blockchain computing network for validation and addition to the at least one data verification blockchain within a new block, said new transaction comprising the hash of the at least one electronic health record, a digital signature of the hash created using a private key of a cryptographic key pair, and a public key of the cryptographic key pair. In some embodiments, the application further comprises a software module verifying the at least one electronic health record by decrypting the encrypted data structure and comparing a second hash of the decrypted data structure with the first hash. In some embodiments, the application further comprises a software module providing tools for the user to grant authorization to one or more third parties to access electronic health records, upload electronic health records, or both. In some embodiments, an authorized third party is a doctor, clinic, hospital, or healthcare provider for the user. In some embodiments, the health data management application is a local software application on a local computing device of the user. In some embodiments, the health data management application is accessed through an online web portal. In some embodiments, the at least one electronic health record is automatically uploaded for storage on the secured database. In some embodiments, the at least one electronic health record is automatically uploaded for verification on the data verification blockchain. In some embodiments, the data verification blockchain is selected from a plurality of blockchains on the distributed blockchain computing network. In some embodiments, the distributed blockchain computing network is a private decentralized peer-to-peer network. In some embodiments, the distributed blockchain computing network is a public decentralized peer-to-peer network. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the application further comprises a software module transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the new block comprises a hash of a previous block on the blockchain, a consensus proof, a timestamp, transaction information, or a combination thereof. In some embodiments, the application further comprising: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on a private decentralized peer-to-peer network. In some embodiments, the data storage blockchain is published on a public decentralized peer-to-peer network. In some embodiments, the at least one electronic health record is anonymized to remove identifying information.

Disclosed herein is a computing device in communication with a plurality of computing devices based on a peer-to-peer protocol, said computing device comprising at least one processor, a memory, and a computer program including instructions executable by the at least one processor to create a health data management application, the application comprising: a) a software module enabling a user or authorized third party to access and upload electronic health records; b) a software module obtaining at least one electronic health record comprising one or more data units for uploading; c) a software module identifying and accessing a data verification blockchain linked to the user; d) a software module processing the at least one electronic health record to generate an encrypted data structure and uploading the encrypted data structure onto a secured database; e) a software module generating a first hash of the at least one electronic health record using a cryptographic hash function; and f) a software module publishing a new transaction comprising the first hash of the data to a distributed blockchain computing network for validation and addition to the at least one data verification blockchain within a new block, said new transaction comprising the hash of the at least one electronic health record, a digital signature of the hash created using a private key of a cryptographic key pair, and a public key of the cryptographic key pair. In some embodiments, the application further comprises a software module verifying the at least one electronic health record by decrypting the encrypted data structure and comparing a second hash of the decrypted data structure with the first hash. In some embodiments, the application further comprises a software module providing tools for the user to grant authorization to one or more third parties to access electronic health records, upload electronic health records, or both. In some embodiments, an authorized third party is a doctor, clinic, hospital, or healthcare provider for the user. In some embodiments, the health data management application is a local software application on a local computing device of the user. In some embodiments, the health data management application is accessed through an online web portal. In some embodiments, the at least one electronic health record is automatically uploaded for storage on the secured database. In some embodiments, the at least one electronic health record is automatically uploaded for verification on the data verification blockchain. In some embodiments, the data verification blockchain is selected from a plurality of blockchains on the distributed blockchain computing network. In some embodiments, the distributed blockchain computing network is a private decentralized peer-to-peer network. In some embodiments, the distributed blockchain computing network is a public decentralized peer-to-peer network. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the application further comprises a software module transferring an amount of a cryptocurrency to compensate one or more mining nodes in the network for performing validation of the new transaction. In some embodiments, the encrypted data structure is secured by asymmetric encryption using a public-private key pair. In some embodiments, the encrypted data structure is secured by symmetric encryption. In some embodiments, a passkey for decrypting the encrypted data structure is secured by asymmetric encryption using a public-private key pair. In some embodiments, the new block comprises a hash of a previous block on the blockchain, a consensus proof, a timestamp, transaction information, or a combination thereof. In some embodiments, the application further comprising: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the encrypted data structure is stored on a data storage blockchain. In some embodiments, the data storage blockchain is published on a private decentralized peer-to-peer network. In some embodiments, the data storage blockchain is published on a public decentralized peer-to-peer network. In some embodiments, the at least one electronic health record is anonymized to remove identifying information.

A computer-implemented method for pseudonymous data certification using a distributed blockchain computing network, the method comprising: obtaining at least one data unit; separating the at least one data unit to into identifying and non-identifying data; generating a first hash of the identifying data; generating a second hash of the first hash and the non-identifying data; publishing a new transaction comprising the second hash to a distributed blockchain computing network for validation and addition to a data verification blockchain within a new block; wherein the identifying data is not required to perform verification of the at least one data unit. In some embodiments, the method further comprises storing the first hash and the identifying and non-identifying data on a secured database. In some embodiments, the method further comprises deleting the identifying data on a secured database. In some embodiments, the method further comprises a) receiving a request for certification of the at least one data unit; b) generating a new hash using the first hash and the non-identifying data; and c) comparing the new hash to the second hash stored on the blockchain to verify the at least one data unit. In some embodiments, the method further comprises issuing a certification of the at least one data unit upon verifying the at least one data unit is unaltered. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the at least one data unit comprises an electronic lab notebook or entry, electronic health record, structured data, log entry, supplier audit information, electronic file, statement of work, signed legal document, compliance manifest, supplier RFI or a portion thereof. In some embodiments, hashing is performed by a cryptographic hash function selected from the group consisting of UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, and SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the method further comprises transferring an amount of a cryptocurrency to compensate one or more mining nodes in the network for performing validation of the new transaction. In some embodiments, the at least one data unit is secured by asymmetric encryption using a public-private key pair. In some embodiments, the at least one data unit is secured by symmetric encryption. In some embodiments, a passkey for decrypting the at least one data unit is secured by asymmetric encryption using a public-private key pair. In some embodiments, the at least one data unit comprises electronic health records. In some embodiments, the at least one data unit comprises at least one entry of an electronic lab notebook. In some embodiments, the new block comprises a hash of a previous block on the blockchain, a consensus proof, a timestamp, transaction information, or a combination thereof. In some embodiments, the method further comprises: a) receiving authorization from a user to share the at least one data unit with an intended recipient; b) decrypting the at least one data unit using a first private key provided by the user; c) securing the at least one data unit using symmetric encryption to generate encrypted data accessible by a passkey; d) encrypting the passkey using asymmetric encryption and a public key of a private-public key pair belonging to the intended recipient; and e) providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the at least one data unit is encrypted and stored on a data storage blockchain. In some embodiments, all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network.

A distributed peer-to-peer computer network for pseudonymous data certification using blockchain, the network comprising: a plurality of computing devices, each said computing device comprising at least one processor, a memory, and an operating system, wherein the plurality of the computing devices communicates based on a peer-to-peer protocol; wherein one of said computing devices is configured for: obtaining at least one data unit; separating the at least one data unit to into identifying and non-identifying data; generating a first hash of the identifying data; generating a second hash of the first hash and the non-identifying data; publishing a new transaction comprising the second hash to a distributed blockchain computing network for validation and addition to a data verification blockchain within a new block; wherein the identifying data is not required to perform verification of the at least one data unit. In some embodiments, the one of said computing devices is further configured for: storing the first hash and the identifying and non-identifying data on a secured database. In some embodiments, the one of said computing devices is further configured for: deleting the identifying data on a secured database. In some embodiments, the one of said computing devices is further configured for: a) receiving a request for certification of the at least one data unit; b) generating a new hash using the first hash and the non-identifying data; and c) comparing the new hash to the second hash stored on the blockchain to verify the at least one data unit. In some embodiments, the one of said computing devices is further configured for issuing a certification of the at least one data unit upon verifying the at least one data unit is unaltered. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the at least one data unit comprises an electronic lab notebook or entry, electronic health record, structured data, log entry, supplier audit information, electronic file, statement of work, signed legal document, compliance manifest, supplier RFI or a portion thereof. In some embodiments, hashing is performed by a cryptographic hash function selected from the group consisting of UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, and SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the one of said computing devices is further configured for transferring an amount of a cryptocurrency to compensate one or more mining nodes in the network for performing validation of the new transaction. In some embodiments, the at least one data unit is secured by asymmetric encryption using a public-private key pair. In some embodiments, the at least one data unit is secured by symmetric encryption. In some embodiments, a passkey for decrypting the at least one data unit is secured by asymmetric encryption using a public-private key pair. In some embodiments, the at least one data unit comprises electronic health records. In some embodiments, the at least one data unit comprises at least one entry of an electronic lab notebook. In some embodiments, the new block comprises a hash of a previous block on the blockchain, a consensus proof, a timestamp, transaction information, or a combination thereof. In some embodiments, the one of said computing devices is further configured for: a) receiving authorization from a user to share the at least one data unit with an intended recipient; b) decrypting the at least one data unit using a first private key provided by the user; c) securing the at least one data unit using symmetric encryption to generate encrypted data accessible by a passkey; d) encrypting the passkey using asymmetric encryption and a public key of a private-public key pair belonging to the intended recipient; and e) providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the at least one data unit is encrypted and stored on a data storage blockchain. In some embodiments, all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network.

Non-transitory computer readable media storing machine readable instructions executable by at least one processor to create an application for pseudonymous data certification using blockchain, the application comprising: a software module obtaining at least one data unit; a software module separating the at least one data unit to into identifying and non-identifying data; a software module generating a first hash of the identifying data; a software module generating a second hash of the first hash and the non-identifying data; a software module publishing a new transaction comprising the second hash to a distributed blockchain computing network for validation and addition to a data verification blockchain within a new block; wherein the identifying data is not required to perform verification of the at least one data unit. In some embodiments, the application further comprises a software module storing the first hash and the identifying and non-identifying data on a secured database. In some embodiments, the application further comprises a software module deleting the identifying data on a secured database. In some embodiments, the application further comprises: a) a software module receiving a request for certification of the at least one data unit; b) a software module generating a new hash using the first hash and the non-identifying data; and c) a software module comparing the new hash to the second hash stored on the blockchain to verify the at least one data unit. In some embodiments, the application further comprises a software module issuing a certification of the at least one data unit upon verifying the at least one data unit is unaltered. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the at least one data unit comprises an electronic lab notebook or entry, electronic health record, structured data, log entry, supplier audit information, electronic file, statement of work, signed legal document, compliance manifest, supplier RFI or a portion thereof. In some embodiments, hashing is performed by a cryptographic hash function selected from the group consisting of UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, and SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the application further comprises a software module transferring an amount of a cryptocurrency to compensate one or more mining nodes in the network for performing validation of the new transaction. In some embodiments, the at least one data unit is secured by asymmetric encryption using a public-private key pair. In some embodiments, the at least one data unit is secured by symmetric encryption. In some embodiments, a passkey for decrypting the at least one data unit is secured by asymmetric encryption using a public-private key pair. In some embodiments, the at least one data unit comprises electronic health records. In some embodiments, the at least one data unit comprises at least one entry of an electronic lab notebook. In some embodiments, the new block comprises a hash of a previous block on the blockchain, a consensus proof, a timestamp, transaction information, or a combination thereof. In some embodiments, the application further comprises: a) a software module receiving authorization from a user to share the at least one data unit with an intended recipient; b) a software module decrypting the at least one data unit using a first private key provided by the user; c) a software module securing the at least one data unit using symmetric encryption to generate encrypted data accessible by a passkey; d) a software module encrypting the passkey using asymmetric encryption and a public key of a private-public key pair belonging to the intended recipient; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. In some embodiments, the at least one data unit is encrypted and stored on a data storage blockchain. In some embodiments, all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network.

In another aspect, disclosed herein is a computer-implemented method for managing electronic records comprising identifying information using a hybrid computing network comprising a centralized storage and a distributed blockchain computing network, the method comprising: a) receiving a first electronic record comprising identifying information for an individual or entity; b) generating a pseudonymous data structure comprising the first electronic record, wherein identifying information is stored within the pseudonymous data structure as an identifying data hash; c) storing the pseudonymous data structure and the first electronic record on a database; d) hashing the pseudonymous data structure using a cryptographic hash function, thereby generating a pseudonymous data hash; e) publishing a first transaction comprising the pseudonymous data hash to a distributed blockchain computing network for validation and addition to a data verification blockchain within a new block. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the first electronic record comprises an electronic lab notebook or entry, electronic health record, structured data, log entry, supplier audit information, electronic file, statement of work, signed legal document, compliance manifest, supplier RFI or a portion thereof. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the method further comprises transferring an amount of a cryptocurrency to compensate one or more mining nodes in the distributed blockchain computing network for performing validation of the first transaction. In some embodiments, the new block comprises a hash of a previous block on the blockchain, a consensus proof, a timestamp, transaction information, or a combination thereof. In some embodiments, the method further comprises verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. In some embodiments, the method further comprises anonymizing the first electronic record. In some embodiments, anonymizing the electronic record comprises removing the identifying information while allowing data verification of the first electronic record. In some embodiments, anonymizing the first electronic record comprises removing the first electronic record from the database while maintaining the pseudonymous data structure, wherein the pseudonymous data structure comprises non-identifying information and the identifying data hash. In some embodiments, the pseudonymous data structure is stored on a data storage blockchain. In some embodiments, the all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network. In some embodiments, the method further comprises performing steps a)-e) for an updated electronic record that is a new version of the first electronic record, wherein an updated transaction corresponding to the updated electronic record is published to the distributed blockchain computing network. In some embodiments, the updated transaction comprises a data structure comprising a reference or link to the first transaction, a transaction version, a hash of the first transaction, or any combination thereof. In some embodiments, the method further comprises verifying the updated transaction.

In another aspect, disclosed herein is a distributed peer-to-peer computer network for data certification using blockchain, the network comprising: n) a plurality of computing devices, each said computing device comprising at least one processor, a memory, and an operating system, wherein the plurality of the computing devices communicates based on a peer-to-peer protocol; wherein one of said computing devices is configured for: a) receiving a first electronic record comprising identifying information for an individual or entity; b) generating a pseudonymous data structure comprising the first electronic record, wherein identifying information is stored within the pseudonymous data structure as an identifying data hash; c) storing the pseudonymous data structure and the first electronic record on a database; d) hashing the pseudonymous data structure using a cryptographic hash function, thereby generating a pseudonymous data hash; e) publishing a first transaction comprising the pseudonymous data hash to a distributed blockchain computing network for validation and addition to a data verification blockchain within a new block. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the first electronic record comprises an electronic lab notebook or entry, electronic health record, structured data, log entry, supplier audit information, electronic file, statement of work, signed legal document, compliance manifest, supplier RFI or a portion thereof. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the computing device is further configured for transferring an amount of a cryptocurrency to compensate one or more mining nodes in the distributed blockchain computing network for performing validation of the first transaction. In some embodiments, the new block comprises a hash of a previous block on the blockchain, a consensus proof, a timestamp, transaction information, or a combination thereof. In some embodiments, the computing device is further configured for verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. In some embodiments, the computing device is further configured for anonymizing the first electronic record. In some embodiments, anonymizing the electronic record comprises removing the identifying information while allowing data verification of the first electronic record. In some embodiments, anonymizing the first electronic record comprises removing the first electronic record from the database while maintaining the pseudonymous data structure, wherein the pseudonymous data structure comprises non-identifying information and the identifying data hash. In some embodiments, the pseudonymous data structure is stored on a data storage blockchain. In some embodiments, the all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network. In some embodiments, the computing device is further configured for performing steps a)-e) for an updated electronic record that is a new version of the first electronic record, wherein an updated transaction corresponding to the updated electronic record is published to the distributed blockchain computing network. In some embodiments, the updated transaction comprises a data structure comprising a reference or link to the first transaction, a transaction version, a hash of the first transaction, or any combination thereof. In some embodiments, the computing device is further configured for verifying the updated transaction.

In another aspect, disclosed herein is a computing device in communication with a plurality of computing devices forming a distributed blockchain computing network based on a peer-to-peer protocol, said computing device comprising at least one processor, a memory, and a computer program including instructions executable by the at least one processor to create a data management application, the application comprising: a) a software module receiving a first electronic record comprising identifying information for an individual or entity; b) a software module generating a pseudonymous data structure comprising the first electronic record, wherein identifying information is stored within the pseudonymous data structure as an identifying data hash; c) a software module storing the pseudonymous data structure and the first electronic record on a database; d) a software module hashing the pseudonymous data structure using a cryptographic hash function, thereby generating a pseudonymous data hash; e) a software module publishing a first transaction comprising the pseudonymous data hash to a distributed blockchain computing network for validation and addition to a data verification blockchain within a new block. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the first electronic record comprises an electronic lab notebook or entry, electronic health record, structured data, log entry, supplier audit information, electronic file, statement of work, signed legal document, compliance manifest, supplier RFI or a portion thereof. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the device is further configured for transferring an amount of a cryptocurrency to compensate one or more mining nodes in the distributed blockchain computing network for performing validation of the first transaction. In some embodiments, the new block comprises a hash of a previous block on the blockchain, a consensus proof, a timestamp, transaction information, or a combination thereof. In some embodiments, the device is further configured for verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. In some embodiments, the device is further configured for anonymizing the first electronic record. In some embodiments, anonymizing the electronic record comprises removing the identifying information while allowing data verification of the first electronic record. In some embodiments, anonymizing the first electronic record comprises removing the first electronic record from the database while maintaining the pseudonymous data structure, wherein the pseudonymous data structure comprises non-identifying information and the identifying data hash. In some embodiments, the pseudonymous data structure is stored on a data storage blockchain. In some embodiments, the all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network. In some embodiments, the device is further configured for performing steps a)-e) for an updated electronic record that is a new version of the first electronic record, wherein an updated transaction corresponding to the updated electronic record is published to the distributed blockchain computing network. In some embodiments, the updated transaction comprises a data structure comprising a reference or link to the first transaction, a transaction version, a hash of the first transaction, or any combination thereof. In some embodiments, the device is further configured for verifying the updated transaction.

In another aspect, disclosed herein is non-transitory computer readable media storing machine readable instructions executable by at least one processor to create an application for certifying data using a distributed blockchain computing network, the application comprising: a) a software module receiving a first electronic record comprising identifying information for an individual or entity; b) a software module generating a pseudonymous data structure comprising the first electronic record, wherein identifying information is stored within the pseudonymous data structure as an identifying data hash; c) a software module storing the pseudonymous data structure and the first electronic record on a database; d) a software module hashing the pseudonymous data structure using a cryptographic hash function, thereby generating a pseudonymous data hash; e) a software module publishing a first transaction comprising the pseudonymous data hash to a distributed blockchain computing network for validation and addition to a data verification blockchain within a new block. In some embodiments, the data verification blockchain is selected from a plurality of blockchains on the distributed blockchain computing network. In some embodiments, the data verification blockchain is shared among all nodes of the distributed blockchain computing network, wherein participants in the network are pre-selected and comprise scientists, research teams, pharmaceutical companies, universities, private enterprises or companies, or a combination thereof. In some embodiments, the distributed blockchain computing network is a private decentralized peer-to-peer network. In some embodiments, the distributed blockchain computing network is a public decentralized peer-to-peer network. In some embodiments, the first electronic record comprises an electronic lab notebook or entry, electronic health record, structured data, log entry, supplier audit information, electronic file, statement of work, signed legal document, compliance manifest, supplier RFI or a portion thereof. In some embodiments, the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. In some embodiments, the cryptographic hash function is SHA-3. In some embodiments, the cryptographic hash function is SHA-256. In some embodiments, the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, the data verification blockchain utilizes Ethereum as a blockchain platform. In some embodiments, the application further comprises a software module transferring an amount of a cryptocurrency to compensate one or more mining nodes in the distributed blockchain computing network for performing validation of the first transaction. In some embodiments, the new block comprises a hash of a previous block on the blockchain, a consensus proof, a timestamp, transaction information, or a combination thereof. In some embodiments, the application further comprises a software module verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. In some embodiments, the application further comprises a software module anonymizing the first electronic record. In some embodiments, anonymizing the electronic record comprises removing the identifying information while allowing data verification of the first electronic record. In some embodiments, anonymizing the first electronic record comprises removing the first electronic record from the database while maintaining the pseudonymous data structure, wherein the pseudonymous data structure comprises non-identifying information and the identifying data hash. In some embodiments, the pseudonymous data structure is stored on a data storage blockchain. In some embodiments, the all participants in a network validating the data storage blockchain are pre-selected and comprise scientists, research teams, pharmaceutical companies, universities, private enterprises or companies, or a combination thereof. In some embodiments, the data storage blockchain is published on a private decentralized peer-to-peer network. In some embodiments, the data storage blockchain is published on a public decentralized peer-to-peer network. In some embodiments, the application is further configured for performing steps a)-e) for an updated electronic record that is a new version of the first electronic record, wherein an updated transaction corresponding to the updated electronic record is published to the distributed blockchain computing network. In some embodiments, the updated transaction comprises a data structure comprising a reference or link to the first transaction, a transaction version, a hash of the first transaction, or any combination thereof. In some embodiments, the application further comprises a software module verifying the updated transaction.

The technologies disclosed herein provide electronic data processing and is applicable to numerous forms of data. Therefore, a person skilled in the art, in light of the disclosure provided herein, will recognize that the technologies are readily applied to many fields.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
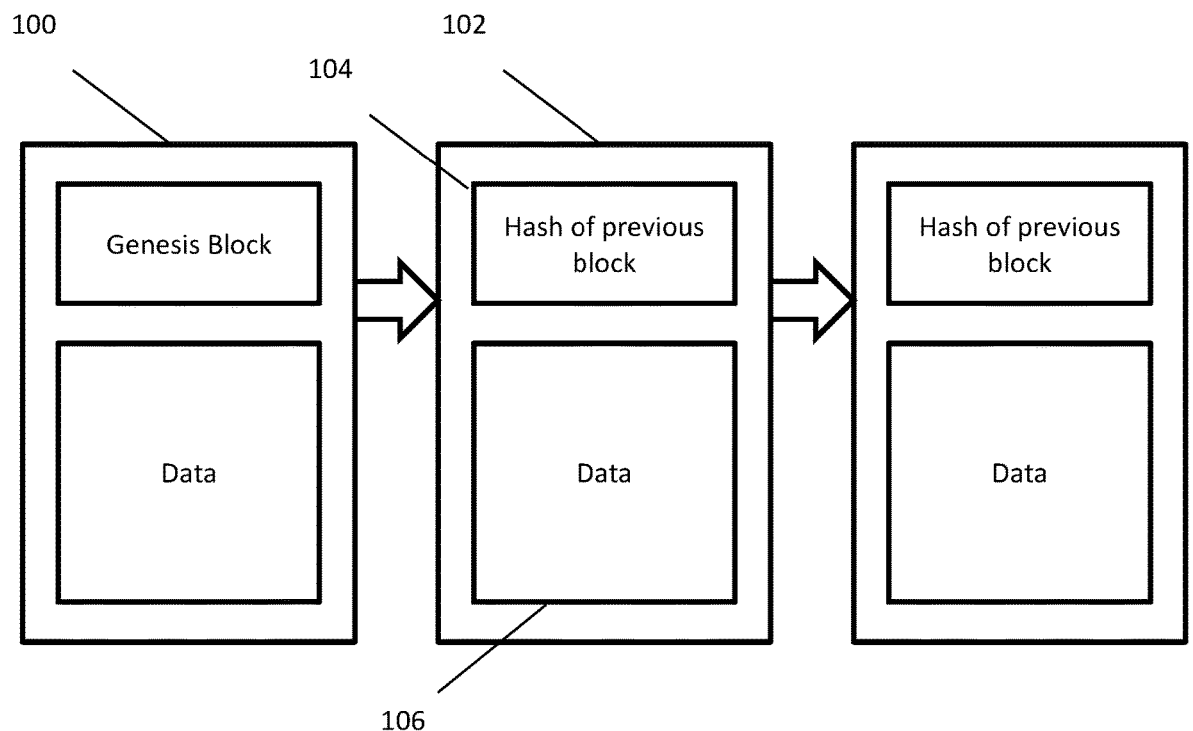
FIG. 1 depicts a blockchain structure.

As described herein, blockchain technology is used to provide verification of data integrity. When combined with a distributed consensus algorithm, such as "proof or work" or "proof of stake" algorithms, a blockchain can act as a distributed, immutable ledger. This ledger can be used to guarantee the integrity of a piece of data without sharing the data itself. On a P2P network, blockchains storing transaction data have no central points of trust, which allows for the use of decentralized applications and services that no longer depend upon a single party for data verification.

Blockchain Applications

The technologies disclosed herein utilize blockchains for building decentralized systems and applications. A blockchain is a data structure that guarantees the consistency of the data it contains. Data is stored in blocks and each block is linked together in a chain. Each block typically stores the cryptographic hash of the entire previous block, inclusive of the data and that block's hash of its previous block. Accordingly, any change or alteration to data in a block would require all subsequent block hashes need to be recomputed. Thus, a blockchain is able to ensure data integrity.

The present disclosure takes advantage of the ability of blockchain to be used to store data. Cryptocurrencies use this data to store transactions. In some aspects, disclosed herein are platforms, systems, and methods for using blockchain to store data structures that comprise the hash of the data to be verified and the digital signature of that hash, which is created using the private key of the owner. In some cases, a plurality of these data structures is added to at least one block in the blockchain. Once added to the blockchain, that data is available for future verification. Implementations can choose to store a reference to the block which contains the hash, or the timestamp of when it was added to aid in future verifications.

Cryptocurrencies and similar technologies are based on blockchain technology. A blockchain is a record database that records every transaction and adds them to a growing list of records as blocks in the blockchain. In some embodiments, every computing node connected to the blockchain peer-to-peer (P2P) network maintains a full copy of the blockchain. Therefore, by analytically traversing the chain of transactions, a computing node can verify the data stored in individual transactions at any point in history such as, for example, a timestamp for a particular transaction. Any alteration to the transaction data would generate a contradictory hash from the block's hash stored in the succeeding block.

In some embodiments, a cryptographic transaction is a cryptographically signed message that transfers an amount of the cryptocurrency from a sender to a recipient address. In some embodiments, the transaction is encrypted using symmetric encryption or asymmetric encryption. In a preferred embodiment, the transaction is encrypted using asymmetric encryption. Asymmetric encryption utilizes private and public keypair for a given address. Thus, both a sender and a recipient will have a public and private keypair. The public key is used to encrypt a message or transaction, and the corresponding private key allows the encrypted transaction to be decrypted. The private key of such a keypair is used to sign transactions from the corresponding address of the sender. The signed transaction is then broadcasted to one or more nodes of the P2P network, and in some cases, every node of the cryptocurrency network. Because the public key is made available to the network, everyone is then able to verify the authenticity of the transaction using the public key from the sender's address.

Transactions can be organized into one or more blocks. A new block includes one or more transactions that have not yet been written into the existing blockchain. Several blocks of an exemplary blockchain are shown in FIG. 1. The blockchain has an initial or genesis block 100 comprising data (e.g. details of a transaction) and a hash of the block's contents. Each subsequent block 102 on the blockchain comprises data 106, a hash of the block's contents, and the hash of the previous block 104 in the blockchain. In some embodiments, the data 106 stored in the block comprises details of a transaction such as a sender, a recipient, transaction information (e.g. amount of a cryptocurrency transferred), and a timestamp. A newly created block is broadcasted and added to the growing blockchain. The new block is then validated by the P2P network through mechanisms such as proof of work or proof of stake. Blocks that are tampered with (e.g. the data is altered) will produce a different hash, which results in the block being rejected. Conversely, the validated block becomes part of the blockchain and is immutable, which means that the transactions of the block are now confirmed and cannot be changed or removed.

Every block in the blockchain contains a cryptographic hash of the previous block on the blockchain, which creates a chain from the first block (genesis block) to the current one. Because each block contains the cryptographic hash referencing the previous block and a hash of the contents of the current block, which is in turn referenced by the subsequent block, any modification of a single block will result in a different hash for every subsequent block on the chain. Thus, the P2P network is able to detect corruption or alteration of blocks in the blockchain all the way back to the most recent confirmed block. This process ensures the integrity of the chain.

Figure 2:
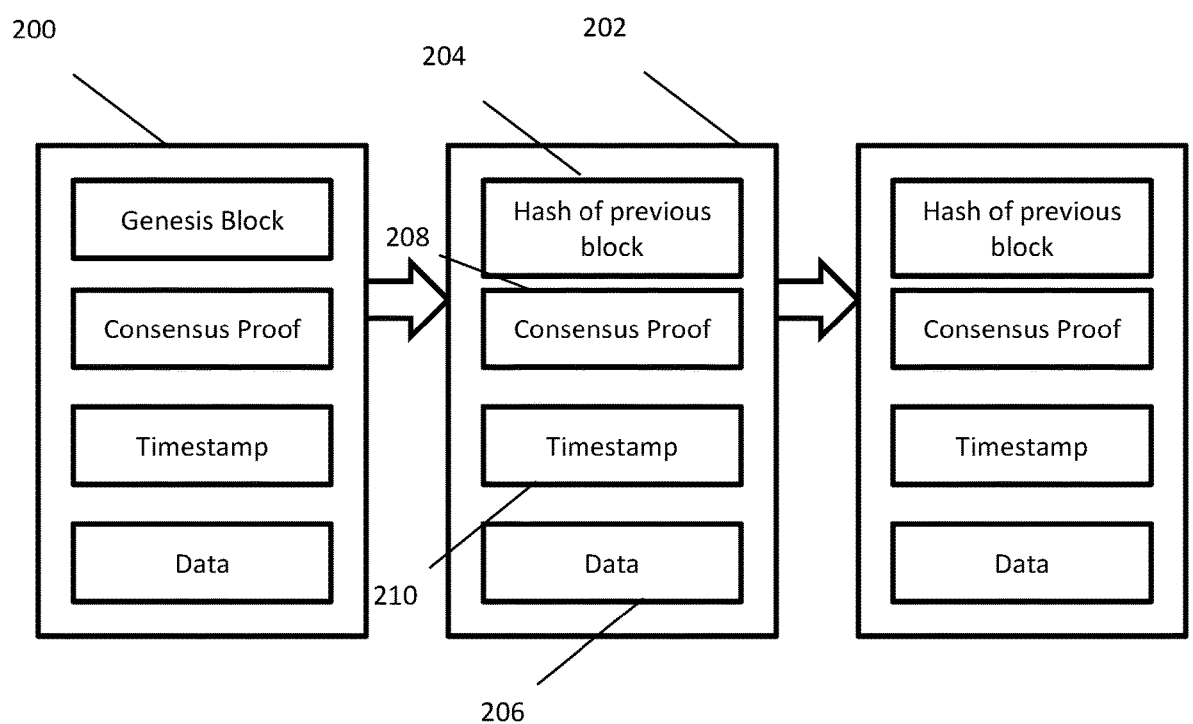
FIG. 2 depicts another blockchain structure.

For a distributed blockchain to function, the participants are generally required to agree on the current state of the blockchain. To achieve consensus, distributed blockchains usually require a timestamp and a "proof". Two methods of establishing this proof are the "proof-of-work" algorithm and the "proof-of-stake" algorithm. The consensus algorithm produces a "proof" which is incorporated into the block and the subsequent block hash. As shown in the exemplary embodiment depicted in FIG. 2, a block 202 comprises the hash 204 of the previous block (in this case, the genesis block 200), the consensus proof 208, a timestamp 210, and the transaction information or data 206.

The process of creating a block and appending it to the blockchain is called mining. Examples of mining algorithms include proof-of-work and proof-of-stake methods. The proof-of-work is a computationally intensive process that requires solving a unique and difficult math problem so that the number of blocks mined each day remains steady. Proof-of-work allows nodes on the network to reach a consensus on a block by having nodes on the network solve a cryptographic puzzle. In Bitcoin, all nodes (also called miners) in the network race to solve the cryptographic puzzle, and the first miner to find the solution gets a reward (e.g. an amount of Bitcoins). In some embodiments, the cryptographic puzzle is configured to require a great deal of trial and error in order to make it difficult to find a solution, while the solution is easy to verify. In Bitcoin, a proof-of-work scheme is SHA-256, which requires the SHA-256 hash of a block's header to be lower than or equal to a specific target value in order for the block to be valid. However, proof-of-work is computationally intensive and requires a significant amount of energy to power the miners. Proof-of-work also incentivizes server farms that benefit from economies of scale in purchasing and running application specific integrated circuit chips (ASICs) designed to conduct mining.

In some embodiments, a proof-of-stake method is used. Advantages of proof-of-stake include faster transaction validation and decreased power consumption. Proof-of-stake does not require all nodes in the P2P network to carry out the mining. Instead, a node (referred to as a validator) is chosen to validate the new block before it is added to the blockchain. Validators are selected or elected in part based on a "stake" the validator node deposits into the network. The stake can be an amount of a currency, a cryptocurrency, or other form of stake. The probability a validator has of being selected to validate the new block is based partly on the size of the stake. Thus, validators with larger stakes have a greater chance of being selected to validate a new block. In order to help ensure legitimacy of the validation process, proof-of-stake causes a validator to lose the stake if it approves fraudulent transactions. Generally, the stake is higher than the amount the validator can gain from transaction fees so as to incentivize validators to reject fraudulent transactions.

Verifying Data Integrity

Figure 3:
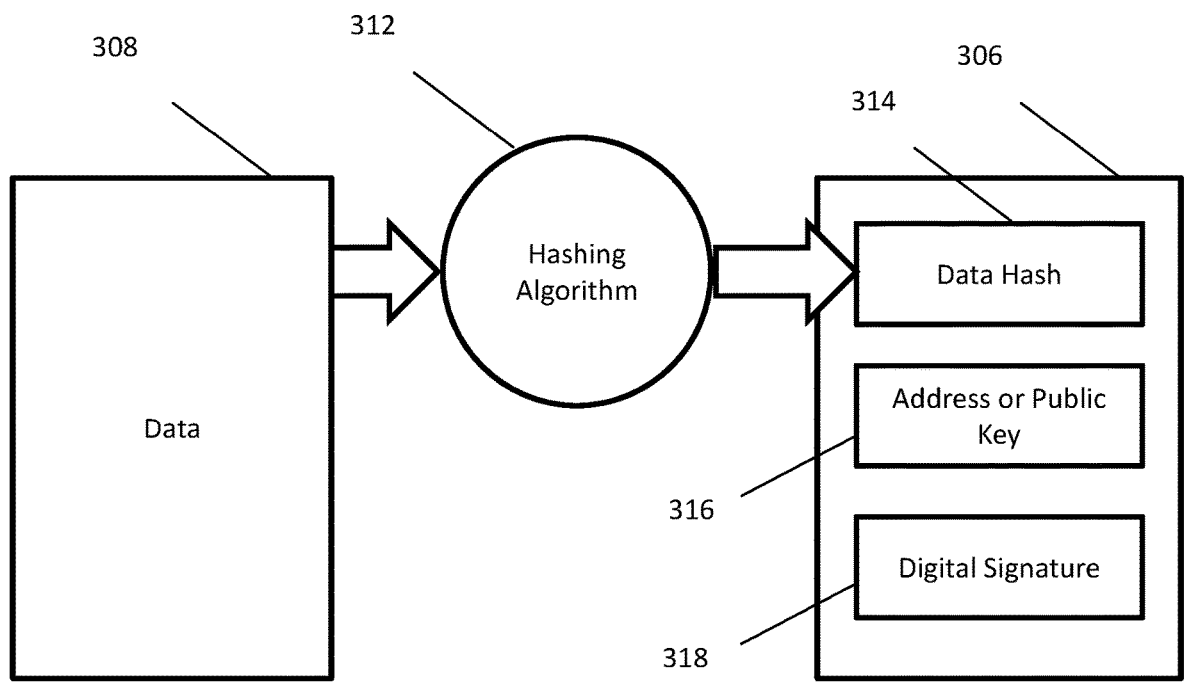
FIG. 3 depicts a process for generating a data structure to be stored in a blockchain.
Figure 4:
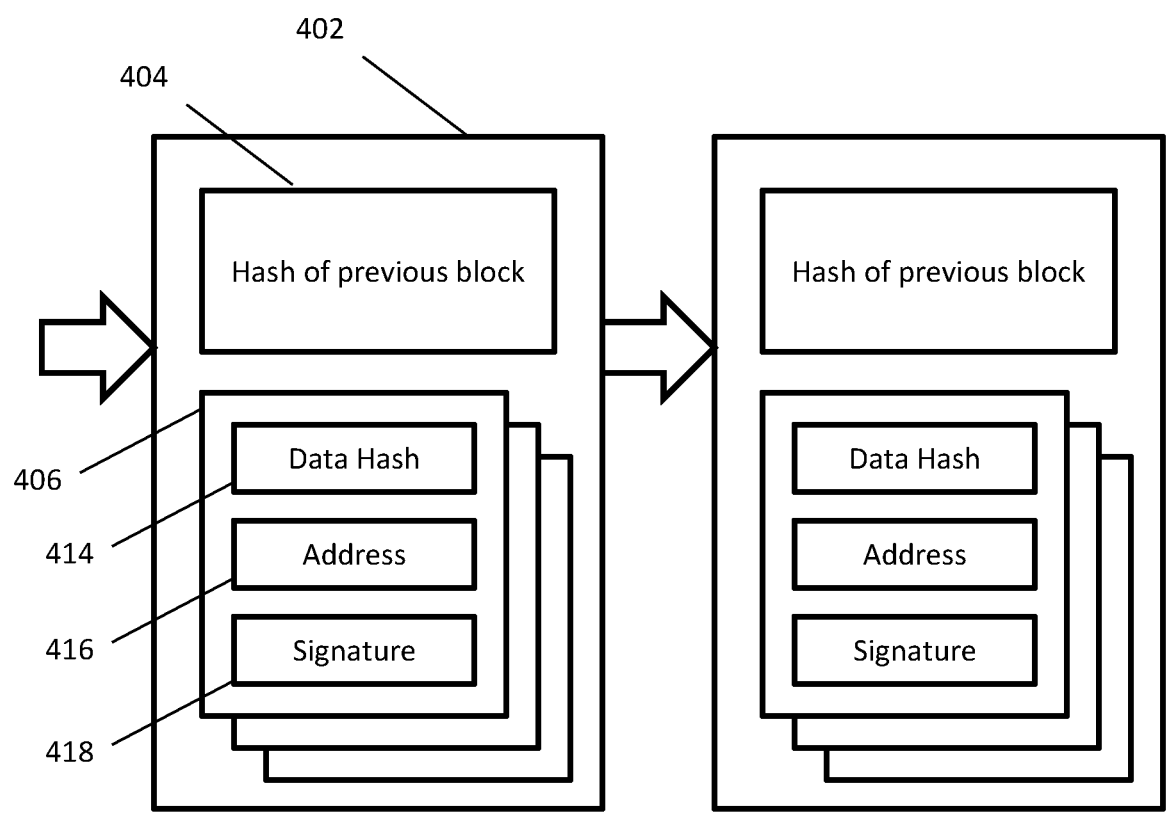
FIG. 4 depicts a blockchain structure having multiple data structures.

In some aspects, disclosed herein are platforms, systems, and methods for verifying data integrity for one or more data structures stored on a blockchain. In some embodiments, the data to be verified 308 is fed through a hashing algorithm 312 to generate a hash of the data 314 as shown in FIG. 3. This hash can be stored on a block along with the address or public key 316 and the digital signature 318. Multiple such data structures or transactions 406 containing the data hash 406, address 416, and signature 418 can be stored in the blocks 402 of the blockchain along with the hash of the previous block 404 as shown in FIG. 4.

Figure 5:
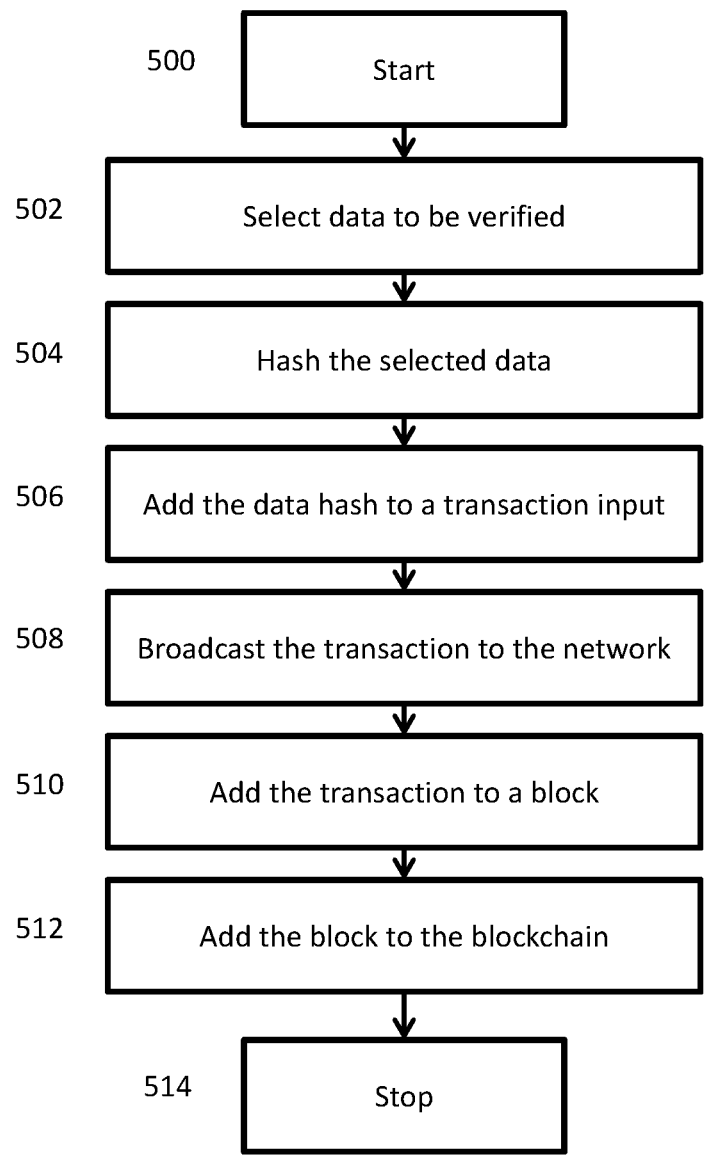
FIG. 5 depicts a flow chart showing a process for securing data integrity for a transaction by generating a block and appending it to a blockchain.

FIG. 5 shows an exemplary process for the generation and appending of a new block to a blockchain. First, the process starts 500 when the data to be verified is selected 502. Next, the data is hashed using a hashing algorithm to generate a unique data hash corresponding to the data input 504. This data hash is added to a transaction input in the new block 506. This transaction is then broadcast to the network of nodes 508. This transaction is added to a block 510, which is itself then added to the blockchain 512. Once the block is verified and added to the blockchain at the end of the process 514, the contents of that transaction become immutable. Once the hash of the data is on the blockchain with its digital signature, anyone with access to the source data and the blockchain can verify that the source data existed and was added to the blockchain by someone with access to the private key which signed the hash. Verification generally requires that the hash is generated using the same cryptographic hashing algorithm that was used to add the original data to the blockchain. Any of a number of hashing algorithms may be used with collision-resistant hashing algorithms being preferred to reduce the chance that the same hash value is generated from different data. In some embodiments, the hash algorithm is selected based on one or more of the following properties: 1) the algorithm is deterministic such that the same data always results in the same hash value; 2) the hash value can be calculated quickly; 3) it is not feasible to generate the data from its hash value by attempting all iterations of the data; 4) any change or alteration to the data will result in a noticeable change to the hash value; and 5) it is highly unlikely that two different data structures result in the same hash value. An example of a suitable hashing algorithm is Secure Hash Algorithm 3 (SHA3).

In some embodiments, data verification comprises identifying the appropriate block storing the transaction at issue. In some embodiments, a reference to the block that contains the hash is stored and used to identify the appropriate transactions. Given the reference, the block can be located, and the data structures in its data field can be searched to find the hash corresponding to the data that is to be verified.

Alternatively, in some embodiments, the blockchain is identified by date range. In some embodiments, the blockchain is examined to locate blocks whose timestamp is within the date range. In some embodiments, when a block is not within the date range, it can be safely disregarded for this search. In some embodiments, when a block is within the date range, the implementation proceeds to check the block's data field for the hash.

In some embodiments, the entire blockchain is searched. In some embodiments, when the search only has a piece of data and no other information (such as timestamps or a reference or identifier of the block), the entire blockchain is searched. In some embodiments, the blocks in a blockchain are tracked using timestamps, a reference or identifier of the block, or information in the block (e.g. a hash value). For example, an electronic lab notebook may contain metadata comprising the hash value of notebook entries or data units thereof and an identifier of the blockchain, thus allowing a person with access to the notebook to identify the specific blockchain and block that can be used for verification.

If the hash is found within the blockchain, using any of the methods described in the present disclosure, the implementation can prove (within the bounds of the consensus proof) 1) that the data has not been altered since the timestamp on the containing block and 2) that the data was added to the blockchain by the person, program or entity that controls the private key which provided the digital signature.

Figure 6:
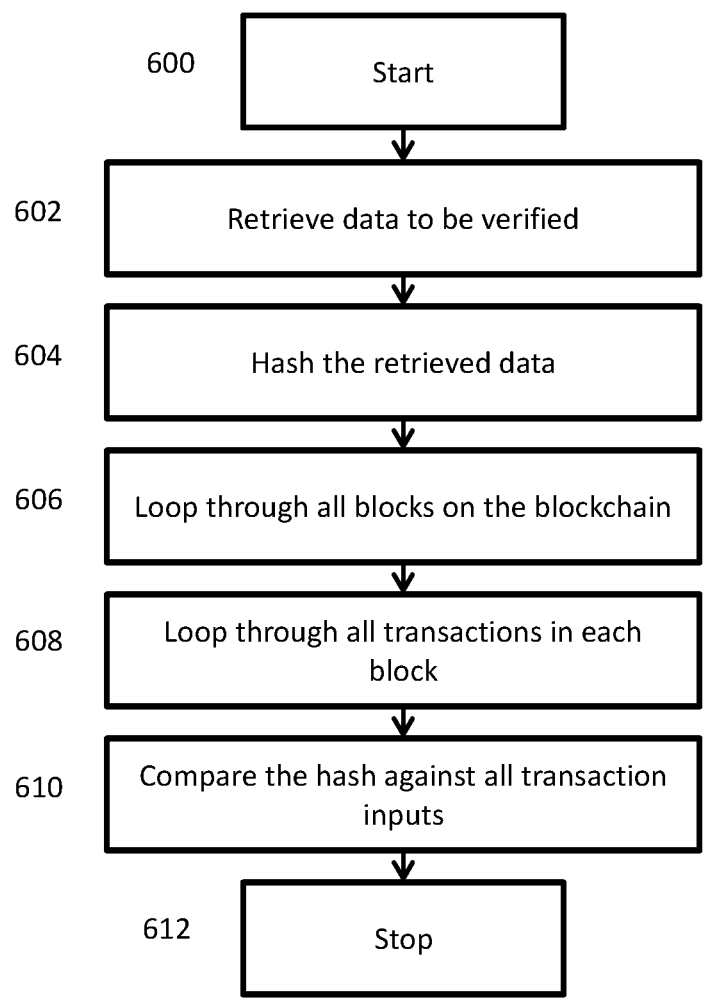
FIG. 6 depicts a flow chart showing a process for verifying a transaction.

FIG. 6 shows an exemplary process for verifying data using blockchain that contains the block with the unique hash for the data. The process starts 600 with the retrieval of the data that is to be verified 602. Examples of such data include electronic lab notebooks or lab entries in the notebooks, structured data, log entries, electronic files, electronic medical records, audit information, and other forms of digital information. In some embodiments, the data to be verified is retrieved from local storage such as from a personal computing device accessed by a user. Alternatively or in combination, the data is stored remotely in an external database and/or cloud storage. In some embodiments, the data is stored in one or more other blockchains. Next, the retrieved data is hashed 604 using the same hashing algorithm that generated the original has stored on the blockchain. The process then loops through the various blocks in the blockchain 606 and the individual transactions stored within each block 608. Once the correct block and transaction(s) corresponding to the data to be verified has been identified, the data hash from the block transaction is 610 compared to the hash generated in step 604. If the hash values are found to be identical, then it would indicate that the data has not been altered, thus verifying the authenticity and timestamp of the data.

Different consensus algorithms can provide different immutability guarantees. For example, "Proof of Work" based algorithms prove that in order to alter the block containing the hash, all subsequent blocks must be re-verified. This means that all subsequent proofs must be recomputed. Since each proof is computationally intensive, this is non-trivial. If a single entity is able to obtain control of at least 51% of the network, then this entity can effectively control the network and approve fake transactions on the blockchain. Conversely, the immutability guarantee is at its strongest when there are numerous nodes verifying the network and none of them control >50% of the computing power.

"Proof of Stake" based algorithms prove that in order to alter the block containing the hash, all subsequent blocks must be re-verified by the network. This would require collusion of many or all of the members of the network. While a "proof-of-stake" based blockchain can be run by a single entity, its guarantees are far stronger when there are numerous verifiers.

In practice, to ensure immutability, the blockchain can be distributed amongst numerous untrusted participants. Since these participants are independent an untrusted, the disclosed methods of sharing the data integrity information without sharing the underlying data is particularly useful.

Disclosed herein, in various aspects, are systems, methods, media, and devices providing a certification service. In some embodiments, an official certification of data integrity is issued upon successful verification of the data or data units. In some embodiments, certification is provided in response to a request is made to verify data integrity. In some embodiments, the request is made by a user who provided the original data. In some embodiments, the request is made by a third party. In some embodiments, the request by the third party must be authorized by the user before the certification service is carried out. In some embodiments, the certification is issued as a formal document or file (e.g. a notarized document with a timestamp and identifier of the document) provided to a requesting party. In some embodiments, the certification is provided as a physical printout or in electronic form (e.g. PDF).

Verifying Pseudonymous Data Integrity

Disclosed herein, in various aspects, are systems, methods, media, and devices providing an information verification service. In some embodiments, a user is able to verify information that has been changed or removed. For example, statutes in certain jurisdictions (e.g. Europe) allow for a citizen to submit requests that a service "forget" the individual's personal information such as an email address. However, if the email address is incorporated into the verified data, the verification is broken. In order to maintain integrity of the verified data while also complying with "right to be forgotten" statutes, the data that may be subject to removal can be hashed prior to incorporation into the data to be verified. This step can be followed by hashing the data that only includes the hash of the sensitive data (e.g. the hash of the sensitive data is hashed and incorporated into the verified data). Optionally, this hash may incorporate a salt. A salt is a random element that is added to the underlying data, which makes the resulting hash more resistant to brute force attacks. Any of the data described herein that is hashed can incorporate a salt. Accordingly, if a service is asked to "forget" the original email address, the verified data remains intact and cannot be used to retrieve the forgotten data. Although the above example is directed to email addresses, other forms of information are contemplated. Examples of confidential information that may be "forgotten" according to the systems and methods disclosed herein include user name, address, email address, phone number, account information (e.g., bank account), photos, videos, social media handles, medical information, or other confidential information. In some embodiments, a hybrid approach combining a distributed blockchain network and non-blockchain storage is utilized to allow both data verification and sensitive data to be forgotten, e.g., deleted. In some embodiments, the sensitive data (e.g., personally identifying information such as name, address, email, social media handles, credit/bank information, etc.) is processed separately from non-sensitive data (e.g., anonymous or anonymized details of a transaction or other electronic record). For example, the sensitive data and the non-sensitive data may be hashed separately to generate two or more hashes. Both the sensitive and non-sensitive data (or just the sensitive data) can be stored off the blockchain itself since the public nature of the blockchain would reveal the sensitive data. The sensitive and non-sensitive data can be hashed together In some embodiments, the data or data units are divided into non-identifiable or anonymized data (e.g. experimental data) and the data that may be removed (e.g. user name/email/address or other identifying information). In some embodiments, the data is anonymized to strip out identifying information to generate anonymized data and the original non-anonymized data. In some embodiments, the non-identifiable or anonymized data and the original or identifiable data are hashed separately to produce distinct hashes, which are stored on the blockchain. In some embodiments, the different hashes are labeled within the block to indicate the type of data (e.g. anonymized/non-anonymized). In some embodiments, when the identifiable data is deleted, the relevant information is still capable of verification through the hash(es) of the non-identifiable or anonymized data. In some embodiments, the data or data units are broken up into multiple subunits that are each used to generate a corresponding hash. Accordingly, data subunits are capable of being verified even if other pieces of data are ultimately deleted or unavailable. This has the benefit of allowing selective access to the data to be verified. For example, a large data block may contain hundreds of experiments from an electronic lab notebook, but a third party may only require verification of a specific experiment. Rather than providing access to the entire data block to the third party, a user may only provide the specific experiment if that experiment has its own corresponding hash stored on the blockchain. In some embodiments, data units are hashed on a per experiment basis (e.g. in the case of electronic lab notebooks). In some embodiments, data units are hashed to generate a hash for each file or record (e.g. in the case of electronic health records).

Disclosed herein, in various aspects, are systems, methods, media, and devices providing data verification in which the data is made pseudonymous to protect at least one of confidential, private, or identifying information. In some embodiments, confidential, identifying, and/or private information (e.g. email, name, address, etc) is hashed to generate a first hash. Next, the first hash and the remaining data (e.g. non-identifying information such as experimental data) are together hashed to generate a second hash. In some embodiments, the second hash is published on the blockchain. Accordingly, verification of the data can be performed by taking the data and generating the first hash, and then the second hash, and comparing the second hash to the original second hash stored on the blockchain. In the event that the private or identifying information is no longer available (e.g. deleted from a private encrypted database), the first hash of that information may be retained since it effectively cannot be used to obtain the underlying information. Accordingly, the first hash and the remaining non-identifying information may be then used to generate the second hash for data verification.

Figure 8:
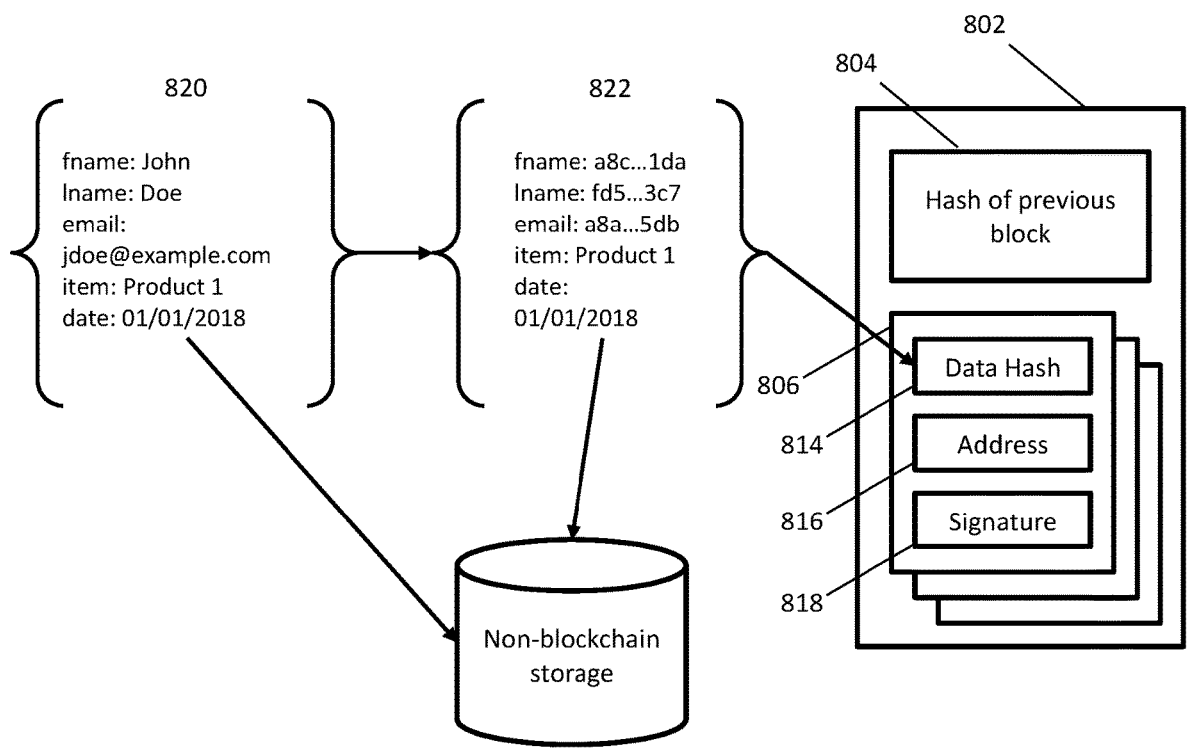
FIG. 8 depicts a hybrid data storage and verification approach utilizing both blockchain and non-blockchain storage.

Disclosed herein, in various aspects, are systems, methods, media, and devices providing data verification using hybrid blockchain storage that combines blockchain storage and non-blockchain storage to allow data verification while allowing personally identifying information to be removed or deleted. An example of this approach is shown in FIG. 8. An electronic data record 820 comprising non-identifying information (e.g., transaction data) and personally identifying information (e.g., name, email) is stored on non-blockchain storage (e.g., an encrypted database). This electronic data record 820 is also stored on non-blockchain storage as a pseudonymous electronic data record 822 in which the personally identifying information is hashed, optionally using a salt, while the non-identifying information is not hashed. The pseudonymous electronic data record is then hashed 814 and stored on a block 802 that is published to a blockchain according to any of the blockchain methods disclosed herein. Alternatively or in combination, the pseudonymous electronic data record can be stored without being hashed. For example, the details of an electronic record or transaction can be publicly available but with the personally identifying information hashed. In some cases, other methods may be utilized to protect the data in the pseudonymous electronic data record stored on the blockchain such as encryption. When the identifying information is to be scrubbed or removed (e.g., upon request by an individual identified by the personally identifying information that invokes a "right to be forgotten"), then the electronic data record 820 can be deleted from the non-blockchain storage. However, the pseudonymous data record 822 can still be verified through the blockchain, for example, hashing the pseudonymous data record record stored on the database will generate a hash that matches the hash stored on the blockchain. Other block components can include the hash of the previous block 804, address 816, and signature 818 that are stored together with the hashed pseudonymous data record 814 in the data structure 806 on the blockchain. The data structure 806 can include a pointer or reference to the non-blockchain storage. Alternatively or in combination, the non-blockchain storage includes a pointer or reference to the data structure 806 and/or block 802. Thus, data verification can be provided even after personally identifying information has been removed using this hybrid blockchain approach.

Electronic Data Record Versioning

Disclosed herein, in various aspects, are systems, methods, media, and devices providing an information verification service including versioning of electronic data records. In some cases, an electronic data record may be uploaded at an initial time and/or date according to any of the methods disclosed herein, but is subsequently modified and uploaded at a later time and/or date. This modification may be relatively minor with no substantive changes, and an individual may wish to obtain verification for the record based on the initial upload time and/or date. Accordingly, a versioning process is disclosed herein that provides for a blockchain data structure enabling multiple versions of an electronic data record that are linked to one another to allow convenient verification.

Figure 9:
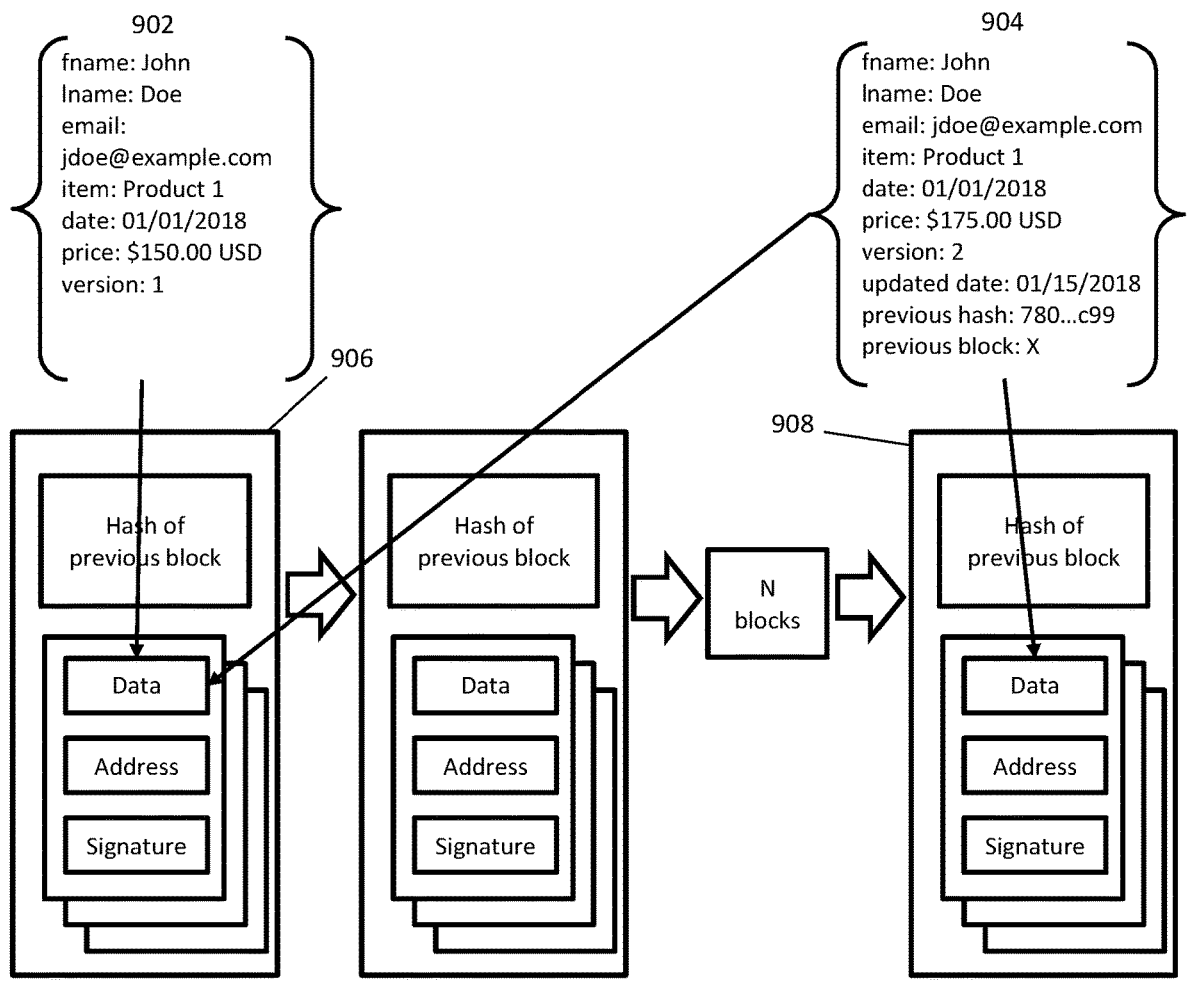
FIG. 9 depicts a blockchain structure configured to allow versioning of data blocks.

An embodiment of the versioning process is illustrated in FIG. 9. As shown, an initial electronic data record 902 is stored on a block 906 in the blockchain and can include an initial time and/or date. Subsequent blocks are added as other electronic records or transactions are published to the blockchain. Then, at a later time, the same record is updated 904 and published to the blockchain as a new block 908. The data structure in this new block 908 contains a reference or link to the earlier block for the earlier version of the electronic record 902. The reference can include a version number, time and/or date, an identifier of the block for the previous version 902 of the updated electronic record 908, a hash of the previous version 902, or any combination thereof. This process can be applied to multiple versions of an electronic record, for example, at least 2, 3, 4, 5, 6, 7, 8, 9, 10, 15, 20, 30, 40, or 50 versions. Accordingly, an individual seeking to verify an electronic record can locate earlier versions of a document and determine the earliest time and/or date for which data from the record can be verified. As a non-limiting example, a first version of an electronic record may contain confirmation information for a purchase order on a first date, which is then updated on a second date with confirmation of payment. Both versions are published to the blockchain according to the process described above. Accordingly, the purchase order can be verified for the first date, but the payment confirmation can be verified only as of the second date. In this example, a merchant that is party to the purchase order may hash its latest version (second version) of the electronic data record and verify the record through the hash matching the hash stored on the blockchain for the second version of the electronic data record. This later block contains a reference or link to the blockchain storing the hash of the earlier version of the data record, which the merchant can also verify with its corresponding earlier data record version.

Decentralized Blockchain Network

Disclosed herein, in various aspects, are systems, methods, media, and devices that utilize blockchain technology implemented on a decentralized peer-to-peer blockchain network. In some embodiments, the network comprises a plurality of nodes. In some embodiments, the plurality of nodes is not controlled by a single entity. In some embodiments, less than 51% of the plurality of nodes is controlled by a single entity. In some embodiments, no single entity or cartel of entities controls more than 1%, 5%, 10%, 15%, 20%, 30%, 40%, 50%, 51%, 60%, 70%, 80%, or 90% of the nodes in the network. In some embodiments, the network comprises nodes that are selected to prevent a 51% attack on the network. In some embodiments, the network is a public blockchain network that allows any participate to join the network as a node in executing the consensus protocol and maintaining the public, shared ledger.

In some embodiments, the network is a private blockchain network that is not open to everyone and may require permission or invitation for a participant to join the network. In some embodiments, a private blockchain network is controlled by a single entity. A private blockchain network can have advantages over public blockchain networks in that the transactions stored in the blocks has greater privacy since the blockchain is not publicly available. In addition, a private blockchain network controlled by a single entity would be responsible for writing and verifying each block. However, such a network would not offer the decentralized security of a public network. In such embodiments, a private blockchain network allows the blockchain to act as an efficient and private ledger or data store. In some In some embodiments, a blockchain network is a consortium blockchain network that comprises a non-public group of trusted nodes. In some embodiments, a blockchain network such as a consortium blockchain network comprises nodes belonging to or controlled by known entities. In some embodiments, the entities include government entities (e.g. FDA, NIH), nonprofit organizations, private enterprises, health enterprises or organizations (e.g. hospitals), educational institutions (e.g. universities), scientists or research teams, and other organizations. As an example, in some embodiments, a pre-selected group of entities collaborate in a private blockchain network and participate in adding transactions to the growing blockchain as they collectively engage in a collaborative research project. In this example, a research team at a university engages in basic research on a new drug compound and obtains animal study data showing efficacy in disease treatment. Successful validation of this data on an Ethereum blockchain by the private network triggers a smart contract on the blockchain that releases investor funds (in the form of a cryptocurrency) in accordance with the established milestone built into the smart contract. The funds are released to a private company collaborating with the research group to finance phase I clinical trials.

In some embodiments, the nodes in the consortium network are controlled by trusted entities such that no significant percentage of the network is controlled by one entity or a group of entities that are allied or have an alignment of interests. In some embodiments, a consortium blockchain network provides limited permission to write new blocks to the blockchain (e.g. not all nodes can generate new blocks). Thus, consortium blockchain networks provide a hybrid between the increased efficiency and privacy of a private blockchain network with the decentralized security of a public blockchain network.

Data Management Portal

Disclosed herein, in various aspects, are systems, methods, media, and devices comprising a data management portal that interfaces with a user and integrates user input with the underlying decentralized blockchain network to provide data integrity verification. In certain embodiments, the data management portal provides tools for a user to setup a profile. In some embodiments, the profile is associated with one or more blockchains. In some embodiments, each blockchain is linked to data comprising digital content such as, for example, an electronic lab notebook and/or notebook entries or electronic health records.

In some embodiments, a data management portal allows a user to login and access a profile that is associated with a plurality of blockchains. As an example, one blockchain contains blocks that hold electronic lab notebook entries in chronological order. In this example, the data management portal is integrated with the user's electronic lab notebook that is accessible through his personal computer. The data in the electronic lab notebook is backed up on a cloud and secured by encryption through the data management portal, which automatically backs up the entries in the notebook. In addition, a given entry is certified on the corresponding blockchain by generating a hash from the entry, user signature, a counter-signature by a third party, and timestamp, and storing that hash on a new block added to the blockchain and published to a private peer-to-peer network.

In some embodiments, the profile contains a unique identifier for each blockchain associated with the profile allowing for rapid location and/or identification of the blockchain. In some embodiments, the data management portal provides a user interface for uploading data, searching uploaded data, selecting data for certification, selecting data for verification, sharing data, or deleting data. In some embodiments, the data management portal provides an option for the user to authorize deletion of a blockchain. In some embodiments, the decentralized blockchain network is a private network of nodes that reach a decision to execute the user's decision to delete the blockchain.

In some embodiments, data verification is carried out using a first blockchain on a first blockchain network, while data storage and/or sharing is carried out using a second blockchain on a second blockchain network. In some embodiments, the first blockchain network is a public network. In some embodiments, the first blockchain network is a private network. In some embodiments, the second blockchain network is a public network. In some embodiments, the second blockchain network is a private network. In some embodiments, the first blockchain network is a public network since the decentralized public network generally provides a stronger guarantee of data immutability or integrity, while the second blockchain network is a private network to provide greater protection of the confidentiality or privacy of the information stored on the second blockchain.

Data

Disclosed herein, in various aspects, are systems, methods, media, and devices for certifying and verifying data using one or more blockchain platforms. In some embodiments, the data comprises one or more log entries. In some embodiments, the data comprises an electronic lab notebook or one or more entries in the electronic lab notebook. In some embodiments, each entry comprises a date/timestamp, a user signature, a counter-signature by a third party, or any combination thereof. In some embodiments, the data comprises electronic medical records (EMRs) and/or electronic health records (EHRs). In some embodiments, the data comprises audit information such as audit questions and/or answers. In some embodiments, the data comprises an electronic lab notebook or entry, electronic health record, structured data, log entry, supplier audit information, electronic file, statement of work, signed legal document, compliance manifest, supplier RFI or a portion thereof. In some embodiments, a blockchain stores transaction information such as hash values corresponding to the data.

In some embodiments, the data is processed to generate an encrypted data structure. The data can be encrypted using an available encryption algorithm. Examples of encryption algorithms include Data Encryption Standard (DES), Triple DES, RSA, Blowfish, Twofish, and Advanced Encryption Standard (AES). DES, Triple DES, Blowfish, Twofish, and AES are symmetric encryption algorithms, which utilize the same key for both encryption and decryption. RSA is an asymmetric encryption algorithm that allows encryption using a public key, and decryption using a private key.

In some embodiments, a particular blockchain stores data for a particular category as transactions in individual blocks generated in chronological order. As an example, a blockchain stores separate entries for an electronic lab notebook as transactions in separate blocks in the blockchain. In some embodiments, the systems, methods, media, and devices disclosed herein utilize dual blockchains to simultaneously provide data verification and storage. As an example, a first blockchain provides data verification and stores the hash value of the data without storing the data itself, while a second blockchain provides the data (e.g. encrypted for privacy). This provides an additional layer of security in which data verification can be performed (e.g. upon third party request) without providing direct access to the underlying data. In some embodiments, a first blockchain provides permission to access the second blockchain, which stores the encrypted data.

In some embodiments, data storage and/or sharing are carried out using one or more underlying blockchains to store and/or share the data. In some embodiments, the data is processed to generate an encrypted data structure as described herein. In some embodiments, the encrypted data structure is encrypted using asymmetric encryption which is generally more secure than symmetric encryption. One challenge with asymmetric encryption is that it requires more computational time to carry out decryption. Accordingly, in some embodiments, data is encrypted using symmetric encryption with a passkey, which is itself encrypted using asymmetric encryption with a public-private key pair, and subsequently shared (e.g. with the user or a third party) by providing the symmetrically encrypted data structure and the asymmetrically encrypted passkey. Accordingly, a recipient of this information is able to decrypt the passkey using the more secure asymmetric encryption, and then decrypt the encrypted data structure using the passkey. Since this embodiment of data sharing utilizes asymmetric encryption of the passkey, which requires little processing power due to its small size, the symmetric encryption passkey can be used to encrypt/decrypt the encrypted data structure for improved speed and efficiency compared to pure asymmetric encryption. Thus, large pieces of data can be encrypted and shared while retaining the security of asymmetric encryption. For example, this process can be especially useful for sharing of electronic lab notebooks or entries thereof and electronic health records which can involve large amounts of data.

Electronic Lab Notebook

Disclosed herein, in some aspects, blockchain technology is used for data verification of electronic lab notebooks. In some embodiments, an electronic lab notebook comprises a software application operating on a computing device of a user. In some embodiments, an electronic lab notebook interfaces with a web portal for accessing, uploading, and managing notebook entries (e.g. a data management portal). In some embodiments, the data management portal interfaces with one or more underlying blockchains for carrying out any of the following: verification of electronic lab notebook entries, secure storage of the entries, and sharing of said entries with third parties. In some embodiments, notebook entries are automatically uploaded to an external network and/or cloud-based backup storage. In some embodiments, the notebook entries are automatically uploaded on a periodic basis such as daily, weekly, biweekly, monthly, or any other period there-between. In some embodiments, verification information for an electronic lab notebook is stored on an underlying blockchain (e.g. data verification blockchain containing hash values and digital signatures of the notebook entries). In some embodiments, the user signs one or more notebook entries with his electronic signature. In some embodiments, the electronic signature is password-secured (e.g. entering the signature requires entry of a password).

In some embodiments, the electronic lab notebook comprises a software module providing an interface or display for a user to add, modify, remove, or upload/backup notebook entries. In some embodiments, the interface is customizable with one or more icons, tabs, or other user selectable elements for accessing one or more categories. Examples of categories include protocols, reagents, experiments, analysis, notes, literature, and other relevant categories.

In some embodiments, the electronic lab notebook comprises a software module for importing protocols. In some embodiments, the software module provides a search tool enabling parameter-based searching of one or more databases containing protocols such as those sourced from commercial protocols (e.g. Qiagen kit protocols), journal publications, online databases (e.g. Springer Protocols website), and/or other available sources. In some embodiments, the electronic lab notebook provides an option to save imported protocols within a protocols category.

In some embodiments, the electronic lab notebook comprises a software module providing customizable templates. A customizable template comprises information relevant to a particular experiment such as, for example, the reagents, protocols, scientific literature, and user notes associated with the experiment. As an example, the electronic lab notebook interface allows a user to select a customizable template for a quantitative PCR experiment, which comprises reagent and protocol information. In some embodiments, multiple customizable templates are linked in a visual flow chart enabling a user to design a customized workflow by selecting from multiple possible templates for each step of the workflow. As an example, the interface enables a user to view a flow chart for quantitative PCR comprising an RNA extraction step, a cDNA generation step, and then the amplification/detection step. In this example, at each step, multiple kits/reagents/protocols are listed as options. The user is able to select the appropriate option for each step to generate the finished workflow. The workflow is then added to the electronic lab notebook entry. As each step in the workflow is completed, the user has the option of locking that section to certify the contents and timestamp of that section of the notebook entry.

In some embodiments, the electronic lab notebook provides tools for locking an entry once it has been entered to prevent further modification. Once an entry has been locked, the user is prevented from entering further changes or additions to the data that has already been entered. In some embodiments, the user has the option of entering additional data to the electronic lab notebook, but lacks authorization to modify the existing locked data. In some embodiments, an encrypted copy of the locked entry is generated and stored in a database such as on a computing device, or a network or cloud-based storage. In some embodiments, locking an entry automatically results in a copy being saved to a database or otherwise stored such as on an underlying data storage blockchain. In some embodiments, the data is stored on one or more blockchains published to a private or public blockchain network. In some embodiments, locking an entry requires a user signature to be entered certifying the contents of the entry. In some embodiments, entries are automatically locked at the end of a calendar day. Automatic locking provides protection for cases when a user forgets to lock and backup his electronic lab notebook at the end of the day. In some embodiments, the electronic lab notebook is maintained online or through a network while also having a local software application or interface that allows the notebook to be managed without requiring network or internet access. In further embodiments, the local application stores the electronic lab notebook or entries thereof locally and uploads to the network or cloud when network/internet access is available.

In some embodiments, the electronic lab notebook comprises a software module allowing a user to modify locked entries. For example, in some cases, a user discovers a mistake in a recorded protocol or mislabels data. The user is then able to modify the locked entries by crossing out or annotating information in the entry, and/or add new information (e.g. crossing out an incorrect label and adding the correct label). In some embodiments, the modified locked entry is used to generate a new transaction that is published to an underlying blockchain. In some embodiments, the transaction is published to a data verification blockchain to certify the modified locked entry. In some embodiments, the transactions published to a data storage blockchain to store the modified locked entry. In some embodiments, the block holding the modified locked entry contains a reference to the block containing the original unmodified locked entry. In this way, the original entry and the modified entry are both tracked and linked together such that any changes to the entry can be reliably traced to a verifiable timestamp.

In some embodiments, the data management portal provides permission settings allowing a user to grant, revoke, or limit access to specific data units from the electronic lab notebook with respect to third parties. In some embodiments, the data management portal allows a user to grant permission to third parties to append additional information to the data units such as, for example, a counter-signature from a primary investigator of the user who is signing off on an electronic lab notebook entry.

Blockchain Platforms

Disclosed herein, in various aspects, are systems, methods, media, and devices for certifying and verifying data using one or more blockchain platforms. Examples of blockchain platforms or protocols include Ethereum, Cardano, MultiChain, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. In some embodiments, Ethereum is used as the blockchain platform. Ethereum is a public, open-source, blockchain-based decentralized computing protocol that features smart contracts functionality (e.g. scripting). The protocol provides a decentralized virtual machine called the Ethereum Virtual Machine (EVM), which carries out Turning-complete scripts by using a network of nodes and a token called ether or gas. The ether or gas is used to protect from network spam and to ensure proportional allocation of resources based on the incentive provided by any given request. Ethereum provides the ability to use smart contracts that can self-execute upon the satisfaction of certain conditions built into the contract. In some embodiments, a block containing one or more smart contracts is generated and published to the blockchain.

Digital Processing Device

In various embodiments, the subject matter described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Figure 7:
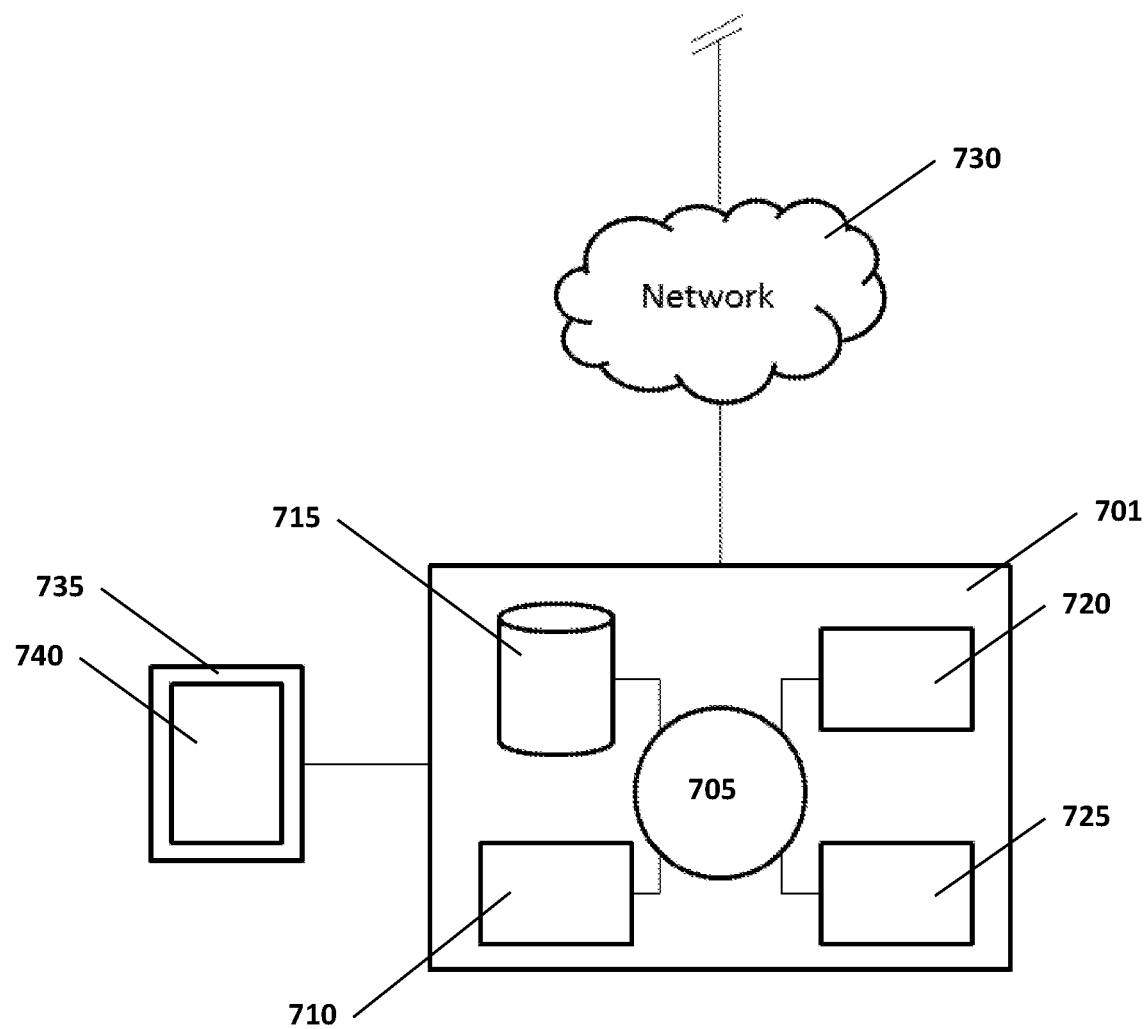
FIG. 7 depicts an embodiment of a digital processing device for carrying out the methods disclosed herein.

Referring to FIG. 7, in a particular embodiment, an exemplary digital processing device 701 is programmed or otherwise configured to append electronic data to a block and publish it to the blockchain according to the methods disclosed herein. The device 701 can regulate various aspects of application and/or maintenance of the blockchain technology of the present disclosure. In this embodiment, the digital processing device 701 includes a central processing unit (CPU, also "processor" and "computer processor" herein) 705, which can be a single core or multi core processor, or a plurality of processors for parallel processing. The digital processing device 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The digital processing device 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the device 701, can implement a peer-to-peer network, which may enable devices coupled to the device 701 to behave as a client or a server.

Continuing to refer to FIG. 7, the CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and write back. The CPU 705 can be part of a circuit, such as an integrated circuit. One or more other components of the device 701 can be included in the circuit. In some cases, the circuit is an application specific integrated circuit (ASIC) or a field programmable gate array (FPGA).

Continuing to refer to FIG. 7, the storage unit 715 can store files, such as drivers, libraries and saved programs. The storage unit 715 can store user data, e.g., user preferences and user programs. The digital processing device 701 in some cases can include one or more additional data storage units that are external, such as located on a remote server that is in communication through an intranet or the Internet.

Continuing to refer to FIG. 7, the digital processing device 701 can communicate with one or more remote computer systems through the network 730. For instance, the device 701 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants. Together, the digital processing device 701 and other remote computer systems in the network 730 can make up the nodes of a decentralized, distributed cryptographic blockchain network.

Methods as described herein can be implemented by way of machine (e.g., computer processor) executable code stored on an electronic storage location of the digital processing device 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710. The digital processing device 701 can be communicatively coupled to a user interface 735 comprising a display 740.

Non-Transitory Computer Readable Storage Medium

In various embodiments, the subject matter disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In various embodiments, the subject matter disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof Software Modules In various embodiments, the subject matter disclosed herein include at least one software module, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In various embodiments, the subject matter disclosed herein include at least one database, or use of the same. In view of the disclosure provided herein, those of skill in the art will recognize that many databases are suitable for storage and retrieval of blockchain, transaction, domain name, routing, and virtual blockchain information. In various embodiments, suitable databases include, by way of non-limiting examples, relational databases, non-relational databases, object oriented databases, object databases, entity-relationship model databases, associative databases, and XML databases. Further non-limiting examples include LevelDB, SQL, SQLite, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices. In some embodiments, a database is based on one or more blockchains published on a distributed/decentralized network.

Certain Terminology

As used herein, a "hash function" or "hashing algorithm" refers to any function that can transform input data of an arbitrary size into a string or hash of a fixed size. In some embodiments, a hash function or algorithm is a cryptographic hash function which is a one-way function, thus making it extremely difficult to determine the input based on the hash output. The cryptographic hash function is configured to always produce the same hash when given the same input. Accordingly, any alteration to the input data can be detected by comparing the hash of the current input data to the hash of the earlier input data. If the data has remained unchanged, the hashes will be identical. Examples of cryptographic hash functions include UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2/4/5/6, RIPEMD-128/160/320, and SHA-1/3/224/256/384/512. As used herein, a "blockchain" refers to a list of records (also referred to as blocks), which are cryptographically linked and secured. The blockchain is typically continuously growing as new blocks are added to the chain. Each block may contain a cryptographic hash of the previous block, a timestamp (e.g. Date/time), and one or more transactions. In some cases, a "blockchain," as described herein, is implemented via a decentralized computing network to form a distributed database or distributed ledger. The decentralized computing network can be a public or private network. A public blockchain network is open to the public such that any participate can join the network as a node in executing the consensus protocol and maintaining the public, shared ledger. A private blockchain network is not open to everyone and may require permission or invitation for a participant to join the network.

As used herein, a "data unit" refers to any amount of electronic data or information. Examples of data units include electronic files, communications, documents, images, videos, contracts, other forms of data, and components thereof. In some cases, a single electronic file (e.g. a document, email, image, etc) is composed of multiple component data units. Thus, a block in a blockchain may contain one or more data units that make up a portion of one or more electronic files.

As used herein, "verification" refers to confirmation that the data or data unit being verified is unaltered. For example, a data unit can be verified by comparing its hash value to the hash value of the original data unit that was stored on a blockchain. Identical hash values would indicate that the data unit being verified is unaltered from the original data unit on the blockchain.

As used herein, "certification" refers to providing a certificate or other formal signifier of the integrity of a data or data unit (e.g. an electronic health record). For example, once a data unit has been verified, a certificate formally attesting to the accuracy and integrity of the data unit may be issued and delivered to a user and/or third party requesting certification.

NUMBERED EMBODIMENTS

The following embodiments recite nonlimiting permutations of combinations of features disclosed herein. Other permutations of combinations of features are also contemplated. In particular, each of these numbered embodiments is contemplated as depending from or relating to every previous or subsequent numbered embodiment, independent of their order as listed. 1. A computer-implemented method for data certification using a distributed blockchain computing network, the method comprising: a) providing tools to a user to generate a profile; b) linking the profile to at least one data verification blockchain; c) providing an interface for uploading at least one data unit for certification and verification; d) processing the at least one data unit to generate an encrypted data structure and storing the encrypted data structure; e) generating a first hash of the at least one data unit using a cryptographic hash function; f) publishing a new transaction comprising the first hash of the data to a distributed blockchain computing network for validation and addition to the at least one data verification blockchain within a new block; g) receiving a request for certification of the at least one data unit; h) retrieving and decrypting the encrypted data structure data to obtain decrypted data for verification; i) hashing the decrypted data using the cryptographic hash function to generate a second hash; j) identifying the new block comprising the new transaction and extracting the first hash from the new block; k) comparing the first hash with the second hash to verify whether the at least one data unit is unaltered; and l) issuing a certification of the at least one data unit upon verifying the at least one data unit is unaltered. 2. The method of embodiment 1, wherein the data verification blockchain is selected from a plurality of blockchains on the distributed blockchain computing network. 3. The method of embodiment 1, wherein the data verification blockchain is shared among all nodes of the distributed blockchain computing network, wherein participants in the network are pre-selected and comprise scientists, research teams, pharmaceutical companies, universities, private enterprises or companies, or a combination thereof 4. The method of embodiment 1, wherein the distributed blockchain computing network is a private decentralized peer-to-peer network. 5. The method of embodiment 1, wherein the distributed blockchain computing network is a public decentralized peer-to-peer network. 6. The method of embodiment 1, wherein the at least one data unit comprises an electronic lab notebook or entry, electronic health record, structured data, log entry, supplier audit information, electronic file, statement of work, signed legal document, compliance manifest, supplier RFI or a portion thereof 7. The method of embodiment 1, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 8. The method of embodiment 1, wherein the cryptographic hash function is SHA-3. 9. The method of embodiment 1, wherein the cryptographic hash function is SHA-256. 10. The method of embodiment 1, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 11. The method of embodiment 1, wherein the data verification blockchain utilizes Ethereum as a blockchain platform. 12. The method of embodiment 1, further comprising transferring an amount of a cryptocurrency to compensate one or more mining nodes in the network for performing validation of the new transaction. 13. The method of embodiment 1, wherein the encrypted data structure is secured by asymmetric encryption using a public-private key pair. 14. The method of embodiment 1, wherein the encrypted data structure is secured by symmetric encryption. 15. The method of embodiment 14, wherein a passkey for decrypting the encrypted data structure is secured by asymmetric encryption using a public-private key pair. 16. The method of embodiment 14, wherein the encrypted data structure comprises electronic health records. 17. The method of embodiment 14, wherein the encrypted data structure comprises at least one entry of an electronic lab notebook. 18. The method of embodiment 1, wherein the new block comprises a hash of a previous block on the blockchain, a consensus proof, a timestamp, transaction information, or a combination thereof. 19. The method of embodiment 1, further comprising: a) receiving authorization from the user to share the encrypted data structure with an intended recipient; b) decrypting the encrypted data structure to obtain the at least one data unit using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. 20. The method of embodiment 1, wherein the encrypted data structure is stored on a data storage blockchain. 21. The method of embodiment 20, wherein the all participants in a network validating the data storage blockchain are pre-selected and comprise scientists, research teams, pharmaceutical companies, universities, private enterprises or companies, or a combination thereof. 22. The method of embodiment 20, wherein the data storage blockchain is published on a private decentralized peer-to-peer network. 23. The method of embodiment 20, wherein the data storage blockchain is published on a public decentralized peer-to-peer network. 24. The method of embodiment 1, wherein the at least one data unit is anonymized to remove identifying information. 25. A distributed peer-to-peer computer network for data certification using blockchain, the network comprising: a) a plurality of computing devices, each said computing device comprising at least one processor, a memory, and an operating system, wherein the plurality of the computing devices communicates based on a peer-to-peer protocol; wherein one of said computing devices is configured for: b) providing tools to a user to generate a profile; c) linking the profile to at least one data verification blockchain; d) providing an interface for uploading at least one data unit for certification and verification; e) processing the at least one data unit to generate an encrypted data structure and storing the encrypted data structure; f) generating a first hash of the at least one data unit using a cryptographic hash function; g) publishing a new transaction comprising the first hash of the data to the network for validation and addition to the at least one data verification blockchain within a new block; h) receiving a request for certification of the at least one data unit; i) retrieving and decrypting the encrypted data structure data to obtain decrypted data for verification; j) hashing the decrypted data using the cryptographic hash function to generate a second hash; k) identifying the new block comprising the new transaction and extracting the first hash from the new block; l) comparing the first hash with the second hash to verify whether the at least one data unit is unaltered; and m) issuing a certification of the at least one data unit upon verifying the at least one data unit is unaltered. 26. The network of embodiment 25, wherein the data verification blockchain is selected from a plurality of blockchains on the network. 27. The network of embodiment 25, wherein the data verification blockchain is shared among all nodes of the distributed blockchain computing network, wherein participants in the network are pre-selected and comprise scientists, research teams, pharmaceutical companies, universities, private enterprises or companies, or a combination thereof. 28. The network of embodiment 25, wherein the network is a private decentralized peer-to-peer network. 29. The network of embodiment 25, wherein the network is a public decentralized peer-to-peer network. 30. The network of embodiment 25, wherein the at least one data unit comprises an electronic lab notebook or entry, electronic health record, structured data, log entry, supplier audit information, electronic file, statement of work, signed legal document, compliance manifest, supplier RFI or a portion thereof. 31. The network of embodiment 25, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 32. The network of embodiment 25, wherein the cryptographic hash function is SHA-3. 33. The network of embodiment 25, wherein the cryptographic hash function is SHA-256. 34. The network of embodiment 25, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 35. The network of embodiment 25, wherein the data verification blockchain utilizes Ethereum as a blockchain platform. 36. The network of embodiment 25, wherein the one of said computing devices is further configured for transferring an amount of a cryptocurrency to compensate one or more mining nodes in the network for performing validation of the new transaction. 37. The network of embodiment 25, wherein the encrypted data structure is secured by asymmetric encryption using a public-private key pair. 38. The network of embodiment 25, wherein the encrypted data structure is secured by symmetric encryption. 39. The network of embodiment 38, wherein a passkey for decrypting the encrypted data structure is secured by asymmetric encryption using a public-private key pair. 40. The network of embodiment 38, wherein the encrypted data structure comprises electronic health records. 41. The network of embodiment 38, wherein the encrypted data structure comprises at least one entry of an electronic lab notebook. 42. The network of embodiment 25, wherein the new block comprises a hash of a previous block on the blockchain, a consensus proof, a timestamp, transaction information, or a combination thereof. 43. The network of embodiment 25, wherein the one of said computing devices is further configured for: a) receiving authorization from the user to share the encrypted data structure with an intended recipient; b) decrypting the encrypted data structure to obtain the data using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. 44. The network of embodiment 25, wherein the encrypted data structure is stored on a data storage blockchain. 45. The network of embodiment 44, wherein the data storage blockchain is published on the network. 46. The network of embodiment 45, wherein the network is a private decentralized peer-to-peer network. 47. The network of embodiment 45, wherein the network is a public decentralized peer-to-peer network. 48. The network of embodiment 25, wherein the at least one data unit is anonymized to remove identifying information. 49. Non-transitory computer readable media storing machine readable instructions executable by at least one processor to create an application for certifying data using blockchain, the application comprising: a) a software module providing tools to a user to generate a profile; b) a software module linking the profile to at least one data verification blockchain; c) a software module providing an interface for uploading at least one data unit for certification and verification; d) a software module processing the at least one data unit to generate an encrypted data structure and storing the encrypted data structure; e) a software module generating a first hash of the at least one data unit using a cryptographic hash function; f) a software module publishing a new transaction comprising the first hash of the data to a distributed blockchain computing network for validation and addition to the at least one data verification blockchain within a new block; g) a software module receiving a request for certification of the at least one data unit; h) a software module retrieving and decrypting the encrypted data structure data to obtain decrypted data for verification; i) a software module hashing the decrypted data using the cryptographic hash function to generate a second hash; j) a software module identifying the new block comprising the new transaction and extracting the first hash from the new block; k) a software module comparing the first hash with the second hash to verify whether the at least one data unit is unaltered; and l) a software module issuing a certification of the at least one data unit upon verifying the at least one data unit is unaltered. 50. The media of embodiment 49, wherein the data verification blockchain is selected from a plurality of blockchains on the distributed blockchain computing network. 51. The media of embodiment 49, wherein the data verification blockchain is shared among all nodes of the distributed blockchain computing network, wherein participants in the network are pre-selected and comprise scientists, research teams, pharmaceutical companies, universities, private enterprises or companies, or a combination thereof. 52. The media of embodiment 49, wherein the distributed blockchain computing network is a private decentralized peer-to-peer network. 53. The media of embodiment 49, wherein the distributed blockchain computing network is a public decentralized peer-to-peer network. 54. The media of embodiment 49, wherein the at least one data unit comprises an electronic lab notebook or entry, electronic health record, structured data, log entry, supplier audit information, electronic file, statement of work, signed legal document, compliance manifest, supplier RFI or a portion thereof. 55. The media of embodiment 49, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 56. The media of embodiment 49, wherein the cryptographic hash function is SHA-3. 57. The media of embodiment 49, wherein the cryptographic hash function is SHA-256. 58. The media of embodiment 49, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 59. The media of embodiment 49, wherein the data verification blockchain utilizes Ethereum as a blockchain platform. 60. The media of embodiment 49, further comprising a software module transferring an amount of a cryptocurrency to compensate one or more mining nodes in the network for performing validation of the new transaction. 61. The media of embodiment 49, wherein the encrypted data structure is secured by asymmetric encryption using a public-private key pair. 62. The media of embodiment 49, wherein the encrypted data structure is secured by symmetric encryption. 63. The media of embodiment 49, wherein a passkey for decrypting the encrypted data structure is secured by asymmetric encryption using a public-private key pair. 64. The media of embodiment 63, wherein the encrypted data structure comprises electronic health records. 65. The media of embodiment 63, wherein the encrypted data structure comprises at least one entry of an electronic lab notebook. 66. The media of embodiment 49, wherein the new block comprises a hash of a previous block on the blockchain, a consensus proof, a timestamp, transaction information, or a combination thereof. 67. The media of embodiment 49, further comprising: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. 68. The media of embodiment 49, wherein the encrypted data structure is stored on a data storage blockchain. 69. The media of embodiment 68, wherein the data storage blockchain is published on a private decentralized peer-to-peer network. 70. The media of embodiment 68, wherein the data storage blockchain is published on a public decentralized peer-to-peer network. 71. The media of embodiment 49, wherein the at least one data unit is anonymized to remove identifying information. 72. A computer-implemented method for managing an electronic lab notebook using a distributed blockchain computing network, the method comprising: a) providing an electronic lab notebook enabling a user to enter, edit, and upload entries; b) obtaining at least one electronic lab notebook entry comprising one or more data units for uploading; c) identifying and accessing a data verification blockchain linked to the electronic lab notebook; d) processing the electronic lab notebook entry to generate an encrypted data structure and uploading the encrypted data structure onto a secured database; e) generating a first hash of the electronic lab notebook entry using a cryptographic hash function; and f) publishing a new transaction comprising the first hash of the data to a distributed blockchain computing network for validation and addition to the at least one data verification blockchain within a new block, said new transaction comprising the hash of the electronic lab notebook entry, a digital signature of the hash created using a private key of a cryptographic key pair, and a public key of the cryptographic key pair. 73. The method of embodiment 72, further comprising verifying the electronic lab notebook entry by decrypting the encrypted data structure and comparing a second hash of the decrypted data structure with the first hash. 74. The method of embodiment 72, wherein the electronic lab notebook is provided through a local software application on a local computing device of the user. 75. The method of embodiment 72, wherein the electronic lab notebook is accessed through an online web portal. 76. The method of embodiment 72, wherein the at least one entry is automatically uploaded for storage on the secured database. 77. The method of embodiment 72, wherein the at least one entry is automatically uploaded for verification on the data verification blockchain. 78. The method of embodiment 72, wherein the data verification blockchain is selected from a plurality of blockchains on the distributed blockchain computing network. 79. The method of embodiment 72, wherein the distributed blockchain computing network is a private decentralized peer-to-peer network. 80. The method of embodiment 72, wherein the distributed blockchain computing network is a public decentralized peer-to-peer network. 81. The method of embodiment 72, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 82. The method of embodiment 72, wherein the cryptographic hash function is SHA-3. 83. The method of embodiment 72, wherein the cryptographic hash function is SHA-256. 84. The method of embodiment 72, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 85. The method of embodiment 72, wherein the data verification blockchain utilizes Ethereum as a blockchain platform. 86. The method of embodiment 72, further comprising transferring an amount of a cryptocurrency to compensate one or more mining nodes in the network for performing validation of the new transaction. 87. The method of embodiment 72, wherein the encrypted data structure is secured by asymmetric encryption using a public-private key pair. 88. The method of embodiment 72, wherein the encrypted data structure is secured by symmetric encryption. 89. The method of embodiment 88, wherein a passkey for decrypting the encrypted data structure is secured by asymmetric encryption using a public-private key pair. 90. The method of embodiment 72, wherein the new block comprises a hash of a previous block on the blockchain, a consensus proof, a timestamp, transaction information, or a combination thereof. 91. The method of embodiment 72, further comprising: a) receiving authorization from the user to share the encrypted data structure with an intended recipient; b) decrypting the encrypted data structure to obtain the electronic lab notebook entry using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. 92. The method of embodiment 72, wherein the encrypted data structure is stored on a data storage blockchain. 93. The method of embodiment 92, wherein the data storage blockchain is published on a private decentralized peer-to-peer network. 94. The method of embodiment 92, wherein the data storage blockchain is published on a public decentralized peer-to-peer network. 95. The method of embodiment 72, wherein the electronic lab notebook entry is anonymized to remove identifying information. 96. Non-transitory computer readable media storing machine readable instructions executable by at least one processor to create an electronic lab notebook application utilizing blockchain technology, the application comprising: a) a software module providing an electronic lab notebook enabling a user to enter, edit, and upload entries; b) a software module obtaining at least one electronic lab notebook entry comprising one or more data units for uploading; c) a software module identifying and accessing a data verification blockchain linked to the electronic lab notebook; d) a software module processing the electronic lab notebook entry to generate an encrypted data structure and uploading the encrypted data structure onto a secured database; e) a software module generating a first hash of the electronic lab notebook entry using a cryptographic hash function; and f) a software module publishing a new transaction comprising the first hash of the data to a distributed blockchain computing network for validation and addition to the at least one data verification blockchain within a new block, said new transaction comprising the hash of the electronic lab notebook entry, a digital signature of the hash created using a private key of a cryptographic key pair, and a public key of the cryptographic key pair. 97. The media of embodiment 96, wherein the application further comprises a software module verifying the electronic lab notebook entry by decrypting the encrypted data structure and comparing a second hash of the decrypted data structure with the first hash. 98. The media of embodiment 96, wherein the electronic lab notebook application is a local software application on a local computing device of the user. 99. The media of embodiment 96, wherein the electronic lab notebook application is accessed through an online web portal. 100. The media of embodiment 96, wherein the at least one entry is automatically uploaded for storage on the secured database. 101. The media of embodiment 96, wherein the at least one entry is automatically uploaded for verification on the data verification blockchain. 102. The media of embodiment 96, wherein the data verification blockchain is selected from a plurality of blockchains on the distributed blockchain computing network. 103. The media of embodiment 96, wherein the distributed blockchain computing network is a private decentralized peer-to-peer network. 104. The media of embodiment 96, wherein the distributed blockchain computing network is a public decentralized peer-to-peer network. 105. The media of embodiment 96, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 106. The media of embodiment 96, wherein the cryptographic hash function is SHA-3. 107. The media of embodiment 96, wherein the cryptographic hash function is SHA-256. 108. The media of embodiment 96, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 109. The media of embodiment 96, wherein the data verification blockchain utilizes Ethereum as a blockchain platform. 110. The media of embodiment 96, wherein the application further comprises a software module transferring an amount of a cryptocurrency to compensate one or more mining nodes in the network for performing validation of the new transaction. 111. The media of embodiment 96, wherein the encrypted data structure is secured by asymmetric encryption using a public-private key pair. 112. The media of embodiment 96, wherein the encrypted data structure is secured by symmetric encryption. 113. The media of embodiment 112, wherein a passkey for decrypting the encrypted data structure is secured by asymmetric encryption using a public-private key pair. 114. The media of embodiment 96, wherein the new block comprises a hash of a previous block on the blockchain, a consensus proof, a timestamp, transaction information, or a combination thereof. 115. The media of embodiment 96, wherein the application further comprises: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. 116. The media of embodiment 96, wherein the encrypted data structure is stored on a data storage blockchain. 117. The media of embodiment 116, wherein the data storage blockchain is published on a private decentralized peer-to-peer network. 118. The media of embodiment 116, wherein the data storage blockchain is published on a public decentralized peer-to-peer network. 119. The media of embodiment 96, wherein the at least one data unit is anonymized to remove identifying information. 120. A computing device in communication with a plurality of computing devices based on a peer-to-peer protocol, said computing device comprising at least one processor, a memory, and a computer program including instructions executable by the at least one processor to create an electronic lab notebook application, the application comprising: a) a software module providing an electronic lab notebook enabling a user to enter, edit, and upload entries; b) a software module obtaining at least one electronic lab notebook entry comprising one or more data units for uploading; c) a software module identifying and accessing a data verification blockchain linked to the electronic lab notebook; d) a software module processing the electronic lab notebook entry to generate an encrypted data structure and uploading the encrypted data structure onto a secured database; e) a software module generating a first hash of the electronic lab notebook entry using a cryptographic hash function; and f) a software module publishing a new transaction comprising the first hash of the data to a distributed blockchain computing network for validation and addition to the at least one data verification blockchain within a new block, said new transaction comprising the hash of the electronic lab notebook entry, a digital signature of the hash created using a private key of a cryptographic key pair, and a public key of the cryptographic key pair. 121. The device of embodiment 120, wherein the application further comprises a software module verifying the electronic lab notebook entry by decrypting the encrypted data structure and comparing a second hash of the decrypted data structure with the first hash. 122. The device of embodiment 120, wherein the electronic lab notebook application is a local software application on a local computing device of the user. 123. The device of embodiment 120, wherein the electronic lab notebook application is accessed through an online web portal. 124. The device of embodiment 120, wherein the at least one entry is automatically uploaded for storage on the secured database. 125. The device of embodiment 120, wherein the at least one entry is automatically uploaded for verification on the data verification blockchain. 126. The device of embodiment 120, wherein the data verification blockchain is selected from a plurality of blockchains on the distributed blockchain computing network. 127. The device of embodiment 120, wherein the distributed blockchain computing network is a private decentralized peer-to-peer network. 128. The device of embodiment 120, wherein the distributed blockchain computing network is a public decentralized peer-to-peer network. 129. The device of embodiment 120, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 130. The device of embodiment 120, wherein the cryptographic hash function is SHA-3. 131. The device of embodiment 120, wherein the cryptographic hash function is SHA-256. 132. The device of embodiment 120, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 133. The device of embodiment 120, wherein the data verification blockchain utilizes Ethereum as a blockchain platform. 134. The device of embodiment 120, wherein the application further comprises a software module transferring an amount of a cryptocurrency to compensate one or more mining nodes in the network for performing validation of the new transaction. 135. The device of embodiment 120, wherein the encrypted data structure is secured by asymmetric encryption using a public-private key pair. 136. The device of embodiment 120, wherein the encrypted data structure is secured by symmetric encryption. 137. The device of embodiment 136, wherein a passkey for decrypting the encrypted data structure is secured by asymmetric encryption using a public-private key pair. 138. The device of embodiment 120, wherein the new block comprises a hash of a previous block on the blockchain, a consensus proof, a timestamp, transaction information, or a combination thereof. 139. The device of embodiment 120, wherein the application further comprises: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. 140. The device of embodiment 120, wherein the encrypted data structure is stored on a data storage blockchain. 141. The device of embodiment 140, wherein the data storage blockchain is published on a private decentralized peer-to-peer network. 142. The device of embodiment 140, wherein the data storage blockchain is published on a public decentralized peer-to-peer network. 143. The device of embodiment 120, wherein the at least one data unit is anonymized to remove identifying information. 144. A computer-implemented method for managing a electronic health records using a distributed blockchain computing network, the method comprising: a) enabling a user or authorized third party to access and upload electronic health records; b) obtaining at least one electronic health record for uploading; c) identifying and accessing a data verification blockchain linked to the user or an identifier thereof; d) processing the at least one electronic health record to generate an encrypted data structure and uploading the encrypted data structure onto a secured database; e) generating a first hash of the at least one electronic health record using a cryptographic hash function; and f) publishing a new transaction comprising the first hash of the data to a distributed blockchain computing network for validation and addition to the at least one data verification blockchain within a new block, said new transaction comprising the hash of the at least one electronic health record, a digital signature of the hash created using a private key of a cryptographic key pair, and a public key of the cryptographic key pair. 145. The method of embodiment 144, further comprising verifying the at least one electronic health record by decrypting the encrypted data structure and comparing a second hash of the decrypted data structure with the first hash. 146. The method of embodiment 144, further comprising providing tools for the user to grant authorization to one or more third parties to access electronic health records, upload electronic health records, or both. 147. The method of embodiment 146, wherein an authorized third party is a doctor, clinic, hospital, or healthcare provider for the user. 148. The method of embodiment 144, wherein the at least one electronic health record is provided through a local software application on a local computing device of the user. 149. The method of embodiment 144, wherein the at least one electronic health record is accessed through an online web portal. 150. The method of embodiment 144, wherein the at least one electronic health record is automatically uploaded for storage on the secured database. 151. The method of embodiment 144, wherein the data verification blockchain is selected from a plurality of blockchains on the distributed blockchain computing network. 152. The method of embodiment 144, wherein the distributed blockchain computing network is a private decentralized peer-to-peer network. 153. The method of embodiment 144, wherein the distributed blockchain computing network is a public decentralized peer-to-peer network. 154. The method of embodiment 144, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 155. The method of embodiment 144, wherein the cryptographic hash function is SHA-3. 156. The method of embodiment 144, wherein the cryptographic hash function is SHA-256. 157. The method of embodiment 144, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 158. The method of embodiment 144, wherein the data verification blockchain utilizes Ethereum as a blockchain platform. 159. The method of embodiment 144, further comprising transferring an amount of a cryptocurrency to compensate one or more mining nodes in the network for performing validation of the new transaction. 160. The method of embodiment 144, wherein the encrypted data structure is secured by asymmetric encryption using a public-private key pair. 161. The method of embodiment 144, wherein the encrypted data structure is secured by symmetric encryption. 162. The method of embodiment 161, wherein a passkey for decrypting the encrypted data structure is secured by asymmetric encryption using a public-private key pair. 163. The method of embodiment 144, wherein the new block comprises a hash of a previous block on the blockchain, a consensus proof, a timestamp, transaction information, or a combination thereof. 164. The method of embodiment 144, further comprising: a) receiving authorization from the user to share the encrypted data structure with an intended recipient; b) decrypting the encrypted data structure to obtain the at least one electronic health record using a first private key provided by the user; c) securing the data using symmetric encryption to generate encrypted data accessible by a passkey; d) encrypting the passkey using asymmetric encryption and a public key of a private-public key pair belonging to an intended recipient of the data; and e) providing the symmetrically encrypted data and the asymmetrically encrypted passkey to the intended recipient, wherein the intended recipient decrypts the encrypted passkey using a second private key of the recipient and decrypts the encrypted data using the passkey. 165. The method of embodiment 144, wherein the encrypted data structure is stored on a data storage blockchain. 166. The method of embodiment 165, wherein the data storage blockchain is published on a private decentralized peer-to-peer network. 167. The method of embodiment 165, wherein the data storage blockchain is published on a public decentralized peer-to-peer network. 168. The method of embodiment 144, wherein the at least one electronic health record is anonymized to remove identifying information. 169. Non-transitory computer readable media storing machine readable instructions executable by at least one processor to create a health data management application utilizing blockchain technology, the application comprising: a) a software module enabling a user or authorized third party to access and upload electronic health records; b) a software module obtaining at least one electronic health record for uploading; c) a software module identifying and accessing a data verification blockchain linked to the user or an identifier thereof; d) a software module processing the at least one electronic health record to generate an encrypted data structure and uploading the encrypted data structure onto a secured database; e) a software module generating a first hash of the at least one electronic health record using a cryptographic hash function; and f) a software module publishing a new transaction comprising the first hash of the data to a distributed blockchain computing network for validation and addition to the at least one data verification blockchain within a new block, said new transaction comprising the hash of the at least one electronic health record, a digital signature of the hash created using a private key of a cryptographic key pair, and a public key of the cryptographic key pair. 170. The media of embodiment 169, wherein the application further comprises a software module verifying the at least one electronic health record by decrypting the encrypted data structure and comparing a second hash of the decrypted data structure with the first hash. 171. The media of embodiment 169, wherein the application further comprises a software module providing tools for the user to grant authorization to one or more third parties to access electronic health records, upload electronic health records, or both. 172. The media of embodiment 169, wherein an authorized third party is a doctor, clinic, hospital, or healthcare provider for the user. 173. The media of embodiment 169, wherein the health data management application is a local software application on a local computing device of the user. 174. The media of embodiment 169, wherein the health data management application is accessed through an online web portal. 175. The media of embodiment 169, wherein the at least one electronic health record is automatically uploaded for storage on the secured database. 176. The media of embodiment 169, wherein the at least one electronic health record is automatically uploaded for verification on the data verification blockchain. 177. The media of embodiment 169, wherein the data verification blockchain is selected from a plurality of blockchains on the distributed blockchain computing network. 178. The media of embodiment 169, wherein the distributed blockchain computing network is a private decentralized peer-to-peer network. 179. The media of embodiment 169, wherein the distributed blockchain computing network is a public decentralized peer-to-peer network. 180. The media of embodiment 169, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 181. The media of embodiment 169, wherein the cryptographic hash function is SHA-3. 182. The media of embodiment 169, wherein the cryptographic hash function is SHA-256. 183. The media of embodiment 169, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 184. The media of embodiment 169, wherein the data verification blockchain utilizes Ethereum as a blockchain platform. 185. The media of embodiment 169, wherein the application further comprises a software module transferring an amount of a cryptocurrency to compensate one or more mining nodes in the network for performing validation of the new transaction. 186. The media of embodiment 169, wherein the encrypted data structure is secured by asymmetric encryption using a public-private key pair. 187. The media of embodiment 169, wherein the encrypted data structure is secured by symmetric encryption. 188. The media of embodiment 187, wherein a passkey for decrypting the encrypted data structure is secured by asymmetric encryption using a public-private key pair. 189. The media of embodiment 169, wherein the new block comprises a hash of a previous block on the blockchain, a consensus proof, a timestamp, transaction information, or a combination thereof. 190. The media of embodiment 169, wherein the application further comprises: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. 191. The media of embodiment 169, wherein the encrypted data structure is stored on a data storage blockchain. 192. The media of embodiment 191, wherein the data storage blockchain is published on a private decentralized peer-to-peer network. 193. The media of embodiment 191, wherein the data storage blockchain is published on a public decentralized peer-to-peer network. 194. The media of embodiment 169, wherein the at least one electronic health record is anonymized to remove identifying information. 195. A computing device in communication with a plurality of computing devices based on a peer-to-peer protocol, said computing device comprising at least one processor, a memory, and a computer program including instructions executable by the at least one processor to create a health data management application, the application comprising: a) a software module enabling a user or authorized third party to access and upload electronic health records; b) a software module obtaining at least one electronic health record comprising one or more data units for uploading; c) a software module identifying and accessing a data verification blockchain linked to the user; d) a software module processing the at least one electronic health record to generate an encrypted data structure and uploading the encrypted data structure onto a secured database; e) a software module generating a first hash of the at least one electronic health record using a cryptographic hash function; and f) a software module publishing a new transaction comprising the first hash of the data to a distributed blockchain computing network for validation and addition to the at least one data verification blockchain within a new block, said new transaction comprising the hash of the at least one electronic health record, a digital signature of the hash created using a private key of a cryptographic key pair, and a public key of the cryptographic key pair. 196. The device of embodiment 195, wherein the application further comprises a software module verifying the at least one electronic health record by decrypting the encrypted data structure and comparing a second hash of the decrypted data structure with the first hash. 197. The device of embodiment 195, wherein the application further comprises a software module providing tools for the user to grant authorization to one or more third parties to access electronic health records, upload electronic health records, or both. 198. The device of embodiment 195, wherein an authorized third party is a doctor, clinic, hospital, or healthcare provider for the user. 199. The device of embodiment 195, wherein the health data management application is a local software application on a local computing device of the user. 200. The device of embodiment 195, wherein the health data management application is accessed through an online web portal. 201. The device of embodiment 195, wherein the at least one electronic health record is automatically uploaded for storage on the secured database. 202. The device of embodiment 195, wherein the at least one electronic health record is automatically uploaded for verification on the data verification blockchain. 203. The device of embodiment 195, wherein the data verification blockchain is selected from a plurality of blockchains on the distributed blockchain computing network. 204. The device of embodiment 195, wherein the distributed blockchain computing network is a private decentralized peer-to-peer network. 205. The device of embodiment 195, wherein the distributed blockchain computing network is a public decentralized peer-to-peer network. 206. The device of embodiment 195, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 207. The device of embodiment 195, wherein the cryptographic hash function is SHA-3. 208. The device of embodiment 195, wherein the cryptographic hash function is SHA-256. 209. The device of embodiment 195, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 210. The device of embodiment 195, wherein the data verification blockchain utilizes Ethereum as a blockchain platform. 211. The device of embodiment 195, wherein the application further comprises a software module transferring an amount of a cryptocurrency to compensate one or more mining nodes in the network for performing validation of the new transaction. 212. The device of embodiment 195, wherein the encrypted data structure is secured by asymmetric encryption using a public-private key pair. 213. The device of embodiment 195, wherein the encrypted data structure is secured by symmetric encryption. 214. The device of embodiment 213, wherein a passkey for decrypting the encrypted data structure is secured by asymmetric encryption using a public-private key pair. 215. The device of embodiment 195, wherein the new block comprises a hash of a previous block on the blockchain, a consensus proof, a timestamp, transaction information, or a combination thereof. 216. The device of embodiment 195, wherein the application further comprises: a) a software module receiving authorization from the user to share the encrypted data structure with an intended recipient; b) a software module decrypting the encrypted data structure to obtain the at least one data unit using a first private key provided by the user; c) a software module securing the data using symmetric encryption to generate encrypted data accessible by a passkey; d) a software module encrypting the passkey using asymmetric encryption and a public key of a private-public key pair belonging to an intended recipient of the data; and e) a software module providing the symmetrically encrypted data and the asymmetrically encrypted passkey to the intended recipient, wherein the intended recipient decrypts the encrypted passkey using a second private key of the recipient and decrypts the encrypted data using the passkey. 217. The device of embodiment 195, wherein the encrypted data structure is stored on a data storage blockchain. 218. The device of embodiment 217, wherein the data storage blockchain is published on a private decentralized peer-to-peer network. 219. The device of embodiment 217, wherein the data storage blockchain is published on a public decentralized peer-to-peer network. 220. The device of embodiment 195, wherein the at least one electronic health record is anonymized to remove identifying information. 221. A computer-implemented method for managing electronic records comprising identifying information using a hybrid computing network comprising a centralized storage and a distributed blockchain computing network, the method comprising: a) receiving a first electronic record comprising identifying information for an individual or entity; b) generating a pseudonymous data structure comprising the first electronic record, wherein identifying information is stored within the pseudonymous data structure as an identifying data hash; c) storing the pseudonymous data structure and the first electronic record on a database; d) hashing the pseudonymous data structure using a cryptographic hash function, thereby generating a pseudonymous data hash; e) publishing a first transaction comprising the pseudonymous data hash to a distributed blockchain computing network for validation and addition to a data verification blockchain within a new block. 222. The method of embodiment 221, wherein the data verification blockchain is selected from a plurality of blockchains on the distributed blockchain computing network. 223. The method of embodiment 221, wherein the data verification blockchain is shared among all nodes of the distributed blockchain computing network, wherein participants in the network are pre-selected and comprise scientists, research teams, pharmaceutical companies, universities, private enterprises or companies, or a combination thereof. 224. The method of embodiment 221, wherein the distributed blockchain computing network is a private decentralized peer-to-peer network. 225. The method of embodiment 221, wherein the distributed blockchain computing network is a public decentralized peer-to-peer network. 226. The method of embodiment 221, wherein the first electronic record comprises an electronic lab notebook or entry, electronic health record, structured data, log entry, supplier audit information, electronic file, statement of work, signed legal document, compliance manifest, supplier RFI or a portion thereof. 227. The method of embodiment 221, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 228. The method of embodiment 221, wherein the cryptographic hash function is SHA-3. 229. The method of embodiment 221, wherein the cryptographic hash function is SHA-256. 230. The method of embodiment 221, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 231. The method of embodiment 221, wherein the data verification blockchain utilizes Ethereum as a blockchain platform. 232. The method of embodiment 221, further comprising transferring an amount of a cryptocurrency to compensate one or more mining nodes in the distributed blockchain computing network for performing validation of the first transaction. 233. The method of embodiment 221, wherein the new block comprises a hash of a previous block on the blockchain, a consensus proof, a timestamp, transaction information, or a combination thereof 234. The method of embodiment 221, wherein the method further comprises verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. 235. The method of embodiment 221, wherein the method further comprises anonymizing the first electronic record. 236. The method of embodiment 235, wherein anonymizing the electronic record comprises removing the identifying information while allowing data verification of the first electronic record. 237. The method of embodiment 235, wherein anonymizing the first electronic record comprises removing the first electronic record from the database while maintaining the pseudonymous data structure, wherein the pseudonymous data structure comprises non-identifying information and the identifying data hash; 238. The method of embodiment 221, wherein the pseudonymous data structure is stored on a data storage blockchain. 239. The method of embodiment 238, wherein the all participants in a network validating the data storage blockchain are pre-selected and comprise scientists, research teams, pharmaceutical companies, universities, private enterprises or companies, or a combination thereof. 240. The method of embodiment 238, wherein the data storage blockchain is published on a private decentralized peer-to-peer network. 241. The method of embodiment 238, wherein the data storage blockchain is published on a public decentralized peer-to-peer network. 242. The method of embodiment 221, wherein the method further comprises performing steps a)-e) for an updated electronic record that is a new version of the first electronic record, wherein an updated transaction corresponding to the updated electronic record is published to the distributed blockchain computing network. 243. The method of embodiment 242, wherein the updated transaction comprises a data structure comprising a reference or link to the first transaction, a transaction version, a hash of the first transaction, or any combination thereof. 244. The method of embodiment 242, wherein the method further comprises verifying the updated transaction. 245. A distributed peer-to-peer computer network for data certification using blockchain, the network comprising: n) a plurality of computing devices, each said computing device comprising at least one processor, a memory, and an operating system, wherein the plurality of the computing devices communicates based on a peer-to-peer protocol; wherein one of said computing devices is configured for: a) receiving a first electronic record comprising identifying information for an individual or entity; b) generating a pseudonymous data structure comprising the first electronic record, wherein identifying information is stored within the pseudonymous data structure as an identifying data hash; c) storing the pseudonymous data structure and the first electronic record on a database; d) hashing the pseudonymous data structure using a cryptographic hash function, thereby generating a pseudonymous data hash; e) publishing a first transaction comprising the pseudonymous data hash to a distributed blockchain computing network for validation and addition to a data verification blockchain within a new block. 246. The network of embodiment 245, wherein the data verification blockchain is selected from a plurality of blockchains on the distributed blockchain computing network. 247. The network of embodiment 245, wherein the data verification blockchain is shared among all nodes of the distributed blockchain computing network, wherein participants in the network are pre-selected and comprise scientists, research teams, pharmaceutical companies, universities, private enterprises or companies, or a combination thereof. 248. The network of embodiment 245, wherein the distributed blockchain computing network is a private decentralized peer-to-peer network. 249. The network of embodiment 245, wherein the distributed blockchain computing network is a public decentralized peer-to-peer network. 250. The network of embodiment 245, wherein the first electronic record comprises an electronic lab notebook or entry, electronic health record, structured data, log entry, supplier audit information, electronic file, statement of work, signed legal document, compliance manifest, supplier RFI or a portion thereof. 251. The network of embodiment 245, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 252. The network of embodiment 245, wherein the cryptographic hash function is SHA-3. 253. The network of embodiment 245, wherein the cryptographic hash function is SHA-256. 254. The network of embodiment 245, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 255. The network of embodiment 245, wherein the data verification blockchain utilizes Ethereum as a blockchain platform. 256. The network of embodiment 245, further comprising transferring an amount of a cryptocurrency to compensate one or more mining nodes in the distributed blockchain computing network for performing validation of the first transaction. 257. The network of embodiment 245, wherein the new block comprises a hash of a previous block on the blockchain, a consensus proof, a timestamp, transaction information, or a combination thereof. 258. The network of embodiment 245, wherein the computing device is further configured for verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. 259. The network of embodiment 245, wherein the computing device is further configured for anonymizing the first electronic record. 260. The network of embodiment 259, wherein anonymizing the electronic record comprises removing the identifying information while allowing data verification of the first electronic record. 261. The network of embodiment 259, wherein anonymizing the first electronic record comprises removing the first electronic record from the database while maintaining the pseudonymous data structure, wherein the pseudonymous data structure comprises non-identifying information and the identifying data hash; 262. The network of embodiment 245, wherein the pseudonymous data structure is stored on a data storage blockchain. 263. The network of embodiment 262, wherein the all participants in a network validating the data storage blockchain are pre-selected and comprise scientists, research teams, pharmaceutical companies, universities, private enterprises or companies, or a combination thereof. 264. The network of embodiment 262, wherein the data storage blockchain is published on a private decentralized peer-to-peer network. 265. The network of embodiment 262, wherein the data storage blockchain is published on a public decentralized peer-to-peer network. 266. The network of embodiment 245, wherein the computing device is further configured for performing steps a)-e) for an updated electronic record that is a new version of the first electronic record, wherein an updated transaction corresponding to the updated electronic record is published to the distributed blockchain computing network. 267. The network of embodiment 266, wherein the updated transaction comprises a data structure comprising a reference or link to the first transaction, a transaction version, a hash of the first transaction, or any combination thereof. 268. The network of embodiment 266, wherein at least one of the computing device is further configured for verifying the updated transaction. 269. A computing device in communication with a plurality of computing devices forming a distributed blockchain computing network based on a peer-to-peer protocol, said computing device comprising at least one processor, a memory, and a computer program including instructions executable by the at least one processor to create a data management application, the application comprising: a) a software module receiving a first electronic record comprising identifying information for an individual or entity; b) a software module generating a pseudonymous data structure comprising the first electronic record, wherein identifying information is stored within the pseudonymous data structure as an identifying data hash; c) a software module storing the pseudonymous data structure and the first electronic record on a database; d) a software module hashing the pseudonymous data structure using a cryptographic hash function, thereby generating a pseudonymous data hash; e) a software module publishing a first transaction comprising the pseudonymous data hash to a distributed blockchain computing network for validation and addition to a data verification blockchain within a new block. 270. The device of embodiment 269, wherein the data verification blockchain is selected from a plurality of blockchains on the distributed blockchain computing network. 271. The device of embodiment 269, wherein the data verification blockchain is shared among all nodes of the distributed blockchain computing network, wherein participants in the network are pre-selected and comprise scientists, research teams, pharmaceutical companies, universities, private enterprises or companies, or a combination thereof. 272. The device of embodiment 269, wherein the distributed blockchain computing network is a private decentralized peer-to-peer network. 273. The device of embodiment 269, wherein the distributed blockchain computing network is a public decentralized peer-to-peer network. 274. The device of embodiment 269, wherein the first electronic record comprises an electronic lab notebook or entry, electronic health record, structured data, log entry, supplier audit information, electronic file, statement of work, signed legal document, compliance manifest, supplier RFI or a portion thereof. 275. The device of embodiment 269, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 276. The device of embodiment 269, wherein the cryptographic hash function is SHA-3. 277. The device of embodiment 269, wherein the cryptographic hash function is SHA-256. 278. The device of embodiment 269, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 279. The device of embodiment 269, wherein the data verification blockchain utilizes Ethereum as a blockchain platform. 280. The device of embodiment 269, wherein the application further comprises a software module transferring an amount of a cryptocurrency to compensate one or more mining nodes in the distributed blockchain computing network for performing validation of the first transaction. 281. The device of embodiment 269, wherein the new block comprises a hash of a previous block on the blockchain, a consensus proof, a timestamp, transaction information, or a combination thereof. 282. The device of embodiment 269, wherein the application further comprises a software module verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. 283. The device of embodiment 269, wherein the application further comprises a software module anonymizing the first electronic record. 284. The device of embodiment 283, wherein anonymizing the electronic record comprises removing the identifying information while allowing data verification of the first electronic record. 285. The device of embodiment 283, wherein anonymizing the first electronic record comprises removing the first electronic record from the database while maintaining the pseudonymous data structure, wherein the pseudonymous data structure comprises non-identifying information and the identifying data hash; 286. The device of embodiment 269, wherein the pseudonymous data structure is stored on a data storage blockchain. 287. The device of embodiment 286, wherein the all participants in a network validating the data storage blockchain are pre-selected and comprise scientists, research teams, pharmaceutical companies, universities, private enterprises or companies, or a combination thereof. 288. The device of embodiment 286, wherein the data storage blockchain is published on a private decentralized peer-to-peer network. 289. The device of embodiment 286, wherein the data storage blockchain is published on a public decentralized peer-to-peer network. 290. The device of embodiment 269, wherein the application is further configured for performing steps a)-e) for an updated electronic record that is a new version of the first electronic record, wherein an updated transaction corresponding to the updated electronic record is published to the distributed blockchain computing network. 291. The device of embodiment 290, wherein the updated transaction comprises a data structure comprising a reference or link to the first transaction, a transaction version, a hash of the first transaction, or any combination thereof. 292. The device of embodiment 290, wherein the application further comprises a software module verifying the updated transaction. 293. Non-transitory computer readable media storing machine readable instructions executable by at least one processor to create an application for certifying data using a distributed blockchain computing network, the application comprising: a) a software module receiving a first electronic record comprising identifying information for an individual or entity; b) a software module generating a pseudonymous data structure comprising the first electronic record, wherein identifying information is stored within the pseudonymous data structure as an identifying data hash; c) a software module storing the pseudonymous data structure and the first electronic record on a database; d) a software module hashing the pseudonymous data structure using a cryptographic hash function, thereby generating a pseudonymous data hash; e) a software module publishing a first transaction comprising the pseudonymous data hash to a distributed blockchain computing network for validation and addition to a data verification blockchain within a new block. 294. The media of embodiment 293, wherein the data verification blockchain is selected from a plurality of blockchains on the distributed blockchain computing network. 295. The media of embodiment 293, wherein the data verification blockchain is shared among all nodes of the distributed blockchain computing network, wherein participants in the network are pre-selected and comprise scientists, research teams, pharmaceutical companies, universities, private enterprises or companies, or a combination thereof. 296. The media of embodiment 293, wherein the distributed blockchain computing network is a private decentralized peer-to-peer network. 297. The media of embodiment 293, wherein the distributed blockchain computing network is a public decentralized peer-to-peer network. 298. The media of embodiment 293, wherein the first electronic record comprises an electronic lab notebook or entry, electronic health record, structured data, log entry, supplier audit information, electronic file, statement of work, signed legal document, compliance manifest, supplier RFI or a portion thereof. 299. The media of embodiment 293, wherein the cryptographic hash function is UMAC, VMAC, PMAC, HMAC, MD6, BLAKE2, BLAKE-256, BLAKE-512, BLAKE2s, BLAKE2b, ECOH, FSB, GOST, HAS-160, HAVAL, MD2, MD4, MD5, MD6, RIPEMD, SHA-1, SHA-3, SHA-224, SHA-256, SHA-384, or SHA-512. 300. The media of embodiment 293, wherein the cryptographic hash function is SHA-3. 301. The media of embodiment 293, wherein the cryptographic hash function is SHA-256. 302. The media of embodiment 293, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, Vertcoin, and Zcash. 303. The media of embodiment 293, wherein the data verification blockchain utilizes Ethereum as a blockchain platform. 304. The media of embodiment 293, wherein the application further comprises a software module transferring an amount of a cryptocurrency to compensate one or more mining nodes in the distributed blockchain computing network for performing validation of the first transaction. 305. The media of embodiment 293, wherein the new block comprises a hash of a previous block on the blockchain, a consensus proof, a timestamp, transaction information, or a combination thereof. 306. The media of embodiment 293, wherein the application further comprises a software module verifying the first electronic record by performing steps comprising: a) obtaining a copy of the pseudonymous data structure; b) hashing the pseudonymous data structure to generate a verification hash; and c) comparing the verification hash to the pseudonymous data hash stored on the blockchain, wherein the electronic record is verified when the verification hash and the pseudonymous data hash match. 307. The media of embodiment 293, wherein the application further comprises a software module anonymizing the first electronic record. 308. The media of embodiment 307, wherein anonymizing the electronic record comprises removing the identifying information while allowing data verification of the first electronic record. 309. The media of embodiment 307, wherein anonymizing the first electronic record comprises removing the first electronic record from the database while maintaining the pseudonymous data structure, wherein the pseudonymous data structure comprises non-identifying information and the identifying data hash; 310. The media of embodiment 293, wherein the pseudonymous data structure is stored on a data storage blockchain. 311. The media of embodiment 310, wherein the all participants in a network validating the data storage blockchain are pre-selected and comprise scientists, research teams, pharmaceutical companies, universities, private enterprises or companies, or a combination thereof. 312. The media of embodiment 310, wherein the data storage blockchain is published on a private decentralized peer-to-peer network. 313. The media of embodiment 310, wherein the data storage blockchain is published on a public decentralized peer-to-peer network. 314. The media of embodiment 293, wherein the application is further configured for performing steps a)-e) for an updated electronic record that is a new version of the first electronic record, wherein an updated transaction corresponding to the updated electronic record is published to the distributed blockchain computing network. 315. The media of embodiment 314, wherein the updated transaction comprises a data structure comprising a reference or link to the first transaction, a transaction version, a hash of the first transaction, or any combination thereof. 316. The media of embodiment 314, wherein the application further comprises a software module verifying the updated transaction.

EXAMPLES

Example 1—Ethereum Based Blockchain Implementation

Implementation of a data integrity blockchain using existing Ethereum crypto currency software is performed. First the network is established and the implementation is able to connect to it and add transactions. The base Ethereum transaction provides the blockchain, consensus protocol and Application Programming Interface (API) for adding transactions. Additionally, those transactions are signed using the sender's private key.

The Ethereum transaction's input data field is used to add a data hash to the blockchain. The input data field is reserved for adding smart contracts to the chain or for sending parameters to existing smart contracts. In this case, a transaction is created from a first address to another address. The data field on this transaction is used for storing the data hash. The method call using the Ethereum EPI is shown:

```
eth_sendTransaction
params: [{
  "from": "0x8b41cb920d6ad43e7eb0dc0f2be5504a04b54a51",
  "to": "0x8b41cb920d6ad43e7eb0dc0f2be5504a04b54a51", // Same as the from address
  "gas": "0x76c0", // 30400
  "gasPrice": "0x9184e72a000", // 10000000000000
  "value": "0x9184e72a", // 2441406250
  "data":
"0xba48073fc2e048d044d3f7a855cb271ac18e9ed38b3b3af8919126de92365596b724aa86e6248
66bc0abd795f32c036b2a9ca86717191a3c4fc5e35bfb0fdcea" // The SHA3 we wish to store
 }]
```

As shown above, the transaction information includes a "from" address and a "to" address for parties to the transaction. In this case, the transaction entails a transfer of "gas" at a "gasPrice". The "data" attribute is a SHA3 hash of the data that is to be verified via the blockchain.

The same request can be written as a web service call using the curl tool:
//Request
curl -X POST --data '{"jsonrpc":"2.0","method":"eth_sendTransaction","params":[{see above}], "id":1}'

Example 2—Log Entry

A data integrity blockchain is implemented to verify log entries such as according to the protocol of Example 1. Each log entry includes a description of some event. Also included is metadata such as timestamp, user, and IP address. These log entries are stored in a log file or a database. An exemplar log entry taken from an NGINX log file is shown:

155.250.198.92 - -[26/Feb/2018:18:01:24+0000] "GET / assets/custom/central/logo.png HTTP/1.1" 200 11325 "-" "Mozilla/4.0 (compatible; MSIE 7.0; Windows NT 6.1; Win64; x64; Trident/7.0; .NET CLR 2.0.50727; SLCC2; . NET CLR 3.5.30729; .NET CLR 3.0.30729; Media Center PC 6.0; .NET4.0C; .NET4.0E; Tablet PC 2.0; Microsoft Outlook 16.0.8431; Microsoft Outlook 16.0.8431; ms-office; MSOffice 16)"

The above log entry is input into an SHA3 hashing algorithm to generate a unique data hash of the log entry: c75bbc16c2927ecbc4feac6c73ebc22061ce0f217b6fda5c3-87a6dd02dd28026b2c189d20f525f282775883b7522a15c7-2997f0d739ce3d15cd7a102761c4539.

This SHA3 hash is then published to a blockchain in a new block as transaction data.

Example 3—Structured Data

A data integrity blockchain is implemented to verify structured such as according to the protocol of Example 1. In this example, data is serialized into a JSON format. The data structure is first converted to its canonical form. In this case, the JSON hashes {"a":1,"b":2} and {"b":2,"a":1} are equivalent. When computing the hash of the data, order and white space (including trailing newlines) matters, even though when the data is functionally equivalent when deserialized. Computing the canonical form will differ for each format. In this case, order, white space and other unimportant differences can result in different serialized forms. Once the canonical form is computed, the SHA3 hash is generated. For example, the canonical form {"a":1,"b":2}input into the hashing algorithm generates the following SHA3 hash: 4482d0762c6ba1510a4b8c0d1f6301a5436a3928149-da314b68a8966dbb03f9f11163 d3 d58e07a9f 5f60967a7-d65f64f977f50daa4fa7af324433 e94ee50b60d.

This SHA3 hash is then added to the blockchain to ensure the underlying data has not been tampered with. For example, any alterations to the structured data will cause the SHA3 hash to be different from the hash stored in the blockchain. This method works for binary formats as well as text based formats.

Example 4—Electronic Files

A data integrity blockchain is implemented to ensure the integrity of specific files such as according to the protocol of Example 1. In this case, the specific file is a PDF file. A company has been contracted to produce a report. Once the report has been completed and the PDF file has been generated, the contracted company computes the hash of that PDF file and adds it to the blockchain.

Once the contracted company transfers the report to the customer, the customer independently generates the SHA3 hash and locates that SHA3 on the blockchain. In doing so, the customer is able to verify that the report has not been tampered with since the timestamp indicated on the blockchain.

Example 5—Electronic Lab Notebook

A data integrity blockchain is implemented to verify entries in an electronic lab notebook such as according to the protocol of Example 1. In this case, the electronic lab notebook is a software application running on a laptop belonging to the researcher and includes daily recorded entries. A daily entry contains several "transactions" each of which corresponds to an experiment performed by a researcher. One experiment includes the details of a QT-PCR experiment evaluating mRNA expression in control and experimental cell lines. A second experiment describes the sequencing of a target gene identifying a cancer mutation in a biological sample. The researcher accesses his electronic lab notebook and enters the experiments under a daily entry. Each experiment is recorded in the daily entry with details of the protocol. The daily entry includes metadata including the timestamp, user, and IP address. At the end of the day, once the experiments are complete, the researcher records the results in the daily entry. Then the researcher signs the daily entry with his signature. Subsequently, the researcher digitally submits the log entry to the primary investigator for a counter-signature. After the primary investigator enters the counter-signature, the information for each experiment, the signature, the counter-signature, and metadata (e.g. timestamp) are input into SHA3 hashing algorithm to generate a unique data hash for the data contents of the new block. The new block also includes an identifier linking it to the electronic lab notebook. The new block is then published to the blockchain corresponding to this specific electronic lab notebook. The nodes of the network then reach a consensus on the new block by solving a cryptographic puzzle under the proof-of-work mining framework. In addition, the electronic lab notebook daily entry is locked to prevent the researcher from modifying its contents. A copy of this daily entry is encrypted and uploaded to a secured cloud storage database.

A year later, the researcher is applying for a patent for a new cancer therapy based on the results of his research. However, another research team at a competing university claims that the critical mutation used to diagnose patients as responsive to this therapy was stolen from their research. During the legal battle to resolve this issue, the researcher grants access to the locked daily entry in his electronic lab notebook as well as the backup entry uploaded to the secured cloud storage database. The daily entry is then input through the SHA3 hashing algorithm to generate the unique data hash for this daily entry. The electronic lab notebook's identifier is then used to search the blockchain for the block corresponding to the daily entry. The unique data hash generated from the daily entry is then compared to the data hash stored in the block. In this case, the two hashes are identical, indicating that the daily entry has not been altered since its timestamp. A review of the decrypted daily entry reveals that the experimental data alleged to have been stolen from the competing research team was, in fact, independently discovered by the researcher who logged this daily entry.

Example 6—Electronic Medical Records

A data integrity blockchain is implemented to ensure the integrity of electronic medical records such as according to the protocol of Example 1. Electronic Medical Records (EMRs) or Electronic Health Records (EHRs) contain sensitive and important data. Great care must be taken to ensure not only the security of this information, but also its veracity. Alteration of such data can entail a human cost (e.g. when a medication dosage is changed). EMR/EHR providers utilize the blockchain to verify each record or sub-record.

Although verification of the medical information is important, a patient wants to be able to provide the secured medical information to an individual authorized to access the information such as the patient's doctor. In this case, a patient's EMRs are encrypted using the patient's public key and stored on the blockchain. Only the patient can access the EMR using his private key. The patient accesses his EMRs stored on the blockchain via a web portal and provides instructions to share the records with his doctor. The EMRs are decrypted using the patient's private key and sent to an encrypted database for temporary storage, and the doctor is sent an electronic message containing a link to the database and an expiring code for accessing the EMRs.

Example 7—Auditing

A data integrity blockchain is implemented to ensure the integrity of responses to an audit such as according to the protocol of Example 1. Facilities operating in regulated industries often undergo third party audits to assess their capabilities. In this case, an audit involves on-site visits with the auditor recording the answers to a standard set of questions. The answers are recorded on an auditing application which then places the entire audit onto a blockchain so that the questions, answers, and timestamp of the time of the audit are securely recorded and can be verified at a later date.

Example 8—Data Storage and Transfer

In addition to a data integrity blockchain implemented to ensure the integrity of data such as electronic medical records or lab notebook entries, the data itself can be stored on a blockchain. In this case, EMRs are verified using blockchain as described in Example the integrity of a lab notebook entry is verified using a data integrity blockchain, while the content of the entry is stored on a separate data storage blockchain. Facilities operating in regulated industries often undergo third party audits to assess their capabilities. In this case, an audit involves on-site visits with the auditor recording the answers to a standard set of questions. The answers are recorded on an auditing application which then places the entire audit onto a blockchain so that the questions, answers, and timestamp of the time of the audit are securely recorded and can be verified at a later date.

Example 9—Pseudonymous Data Storage & Verification

A merchant wishes to provide blockchain verification for certain transactions but without risking personally identifying information. An order from a customer comes through requesting delivery of 1000 units of a widget. The merchant generates an electronic data record confirming the order. The customer information is hashed and then and stored together with the unhashed non-identifying order information (e.g., 100 units of a widget) on a database as a pseudonymous electronic data record. An unhashed electronic data record is also stored on the database. The pseudonymous electronic data record is then hashed again, and the hash is stored on the blockchain. The merchant sends a copy of the pseudonymous electronic data record to the customer confirming the order. The customer is then able to verify the order by using the same hashing function on the pseudonymous electronic data record and comparing the hash to the hash stored on the corresponding block.

Example 10—Data Removal

Order information is stored on the blockchain as described in Example 9. The customer later cancels the order and requests any personally identifying information be removed. Accordingly, the merchant deletes its unhashed electronic data record, thus erasing any personally identifying information associated with the order. The pseudonymous electronic data record is maintained to provide verification for the initial order but without jeopardizing any identifying customer information. This allows the customer to allow verification of its records while protecting customer information.

Example 11—Data Record Versioning

Order information is stored on the blockchain as described in Example 9. Subsequently, the customer updates the order to request 2000 units of the widget. The initial electronic data record is stored on a block in the blockchain at an initial date. More blocks are added as other electronic records or transactions are published to the blockchain. When the customer updates the order, a new electronic data record is generated and published to the blockchain as a new block at this later date. The data structure in this new block contains a reference to the earlier block for the initial version of the electronic record. The reference includes the version number, date of the order, an an identifier of the block for the initial version of the electronic record, and a hash of the initial version.

The merchant sends a copy of the updated electronic record containing the customer order to the customer. The customer then verifies the record by comparing the hash to the blockchain as described in Example 9. The customer is also able to follow the reference to the earlier block and confirm the earlier order details. Thus, the multiple versions of the order verified on the blockchain establish that the initial order has since been updated from 1000 widets to 2000 widgets.

While preferred embodiments have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in practicing the disclosure. It is intended that the following claims define the scope of the invention and that methods and structures within the scope of these claims and their equivalents be covered thereby.

What is claimed is:

1. A computer-implemented method for data certification using a distributed blockchain computing network, the method comprising:
    a) providing tools to a user to generate a profile;
    b) linking the profile to at least one data verification blockchain;
    c) providing an interface for uploading at least one data unit for certification and verification;
    d) processing the at least one data unit to generate an encrypted data structure and storing the encrypted data structure;
    e) securing the encrypted data structure using symmetric encryption accessible by a passkey, wherein the passkey is encrypted using asymmetric encryption and a public key of a private-public key pair belonging to an intended recipient of the data structure and wherein the intended recipient decrypts the encrypted passkey using a private key of the recipient and decrypts the encrypted data using the passkey;
    f) generating a first hash of the at least one data unit using a cryptographic hash function;
    g) publishing a new transaction comprising the first hash of the data to a distributed blockchain computing network for validation and addition to the at least one data verification blockchain within a new block;
    h) receiving a request for certification of the at least one data unit;
    i) retrieving and decrypting the encrypted data structure data to obtain decrypted data for verification;
    j) hashing the decrypted data using the cryptographic hash function to generate a second hash;
    k) identifying the new block comprising the new transaction and extracting the first hash from the new block;
    l) comparing the first hash with the second hash to verify whether the at least one data unit is unaltered; and
    m) issuing a certification of the at least one data unit upon verifying the at least one data unit is unaltered.

2. The method of claim 1, wherein the data verification blockchain is shared among all nodes of the distributed blockchain computing network, wherein participants in the network are pre-selected and comprise scientists, research teams, pharmaceutical companies, universities, private enterprises or companies, or a combination thereof.

3. The method of claim 1, wherein the distributed blockchain computing network is a private decentralized peer-to-peer network or a public decentralized peer-to-peer network.

4. The method of claim 1, wherein the at least one data unit comprises an electronic lab notebook or entry, electronic health record, structured data, log entry, supplier audit information, electronic file, statement of work, signed legal document, compliance manifest, supplier RFI or a portion thereof.

5. The method of claim 1, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, and Vertcoin.

6. The method of claim 1, wherein the data verification blockchain utilizes Ethereum as a blockchain platform.

7. The method of claim 1, wherein the encrypted data structure is secured by asymmetric encryption using a public-private key pair.

8. The method of claim 1, wherein the encrypted data structure is secured by symmetric encryption.

9. The method of claim 8, wherein the encrypted data structure comprises electronic health records.

10. The method of claim 8, wherein the encrypted data structure comprises at least one entry of an electronic lab notebook.

11. The method of claim 1, further comprising:
    a) receiving authorization from the user to share the encrypted data structure with the intended recipient;
    b) decrypting the encrypted data structure to obtain the at least one data unit using a first private key provided by the user;
    c) securing the data using symmetric encryption to generate encrypted data accessible by the passkey;
    d) encrypting the passkey using the asymmetric encryption and the public key of the private-public key pair belonging to the intended recipient of the data; and
    e) providing the symmetrically encrypted data and the asymmetrically encrypted passkey to the intended recipient.

12. A computing device in communication with a plurality of computing devices based on a peer-to-peer protocol, said computing device comprising at least one processor, a memory, and a computer program including instructions executable by the at least one processor to create an electronic lab notebook application, the application comprising:
    a) a software module providing an electronic lab notebook enabling a user to enter, edit, and upload entries;
    b) a software module obtaining at least one electronic lab notebook entry comprising one or more data units for uploading;
    c) a software module identifying and accessing a data verifications hlockchain linked to the electronic lab notebook;
    d) a software module processing the electronic lab notebook entry to generate an encrypted data structure and uploading the encrypted data structure onto a secured database;
    a software module securing the encrypted data structure using symmetric encryption accessible by a passkey, wherein the passkey is encrypted using asymmetric encryption and a public key of a private-public key pair belonging to an intended recipient of the data structure, and wherein the intended recipient decrypts the encrypted passkey using a private key of the recipient and decrypts the encrypted data using the passkey;
    f) a software module generating a first hash of the electronic lab notebook entry using a cryptographic hash function; and
    g) a software module publishing a new transaction comprising the first hash of the data to a distributed blockchain computing network for validation and addition to the at least one data verification blockchain within a new block, said new transaction comprising the hash of the electronic lab notebook entry, a digital signature of the hash created using a private key of a cryptographic key pair, and a public key of the cryptographic key pair.

13. The device of claim 12, wherein the application further comprises a software module verifying the electronic lab notebook entry by decrypting the encrypted data. structure and comparing a second hash of the decrypted data structure with the first hash.

14. The device of claim 12, wherein the electronic lab notebook application is a local software application on a local computing device of the user.

15. The device of claim 12, wherein the data verification blockchain utilizes a blockchain platform selected from the group consisting of Ethereum, Zcash, Litecoin, Namecoin, Swiftcoin, Bytecoin, Peercoin, Emercoin, Feathercoin, Gridcoin, Primecoin, Ripple, Auroracoin, Dash, Zetacoin, Monero, Tether, Mazacoin, and Vertcoin.

16. The device of claim 12, wherein the application further comprises:
   a) a software module receiving authorization from the user to share the encrypted data structure with the intended recipient;
   b) a software module decrypting the encrypted data structure to obtain the at least one data unit using a. first private key provided by the user;
   c) a software module securing the data using symmetric encryption to generate encrypted data accessible by the passkey;
   d) a software module encrypting the passkey using the asymmetric encryption and the public key of the private-public key pair belonging to the intended recipient of the data; and
   e) a software module providing the symmetrically encrypted data and the asymmetrically encrypted passkey to the intended recipient.

17. A computing device in communication with a plurality of computing devices forming a distributed blockchain computing network based on a peer-to-peer protocol, said computing device comprising at least one processor, a memory, and a computer program including instructions executable by the at least one processor to create a data management application, the application comprising:
   a) a software module receiving a first electronic record comprising identifying information for an individual or entity;
   b) a software module generating a pseudonymous data structure comprising the first electronic record, wherein identifying information is stored within the pseudonymous data structure as an identifying data hash, optionally including a salt;
   c) a software module storing the pseudonymous data structure and the first electronic record on a database;
   d) a software module securing the pseudonymous data structure using symmetric encryption accessible by a passkey, wherein the passkey is encrypted using asymmetric encryption and a public key of a private-public key pair belonging to an intended recipient of the data structure, and wherein the intended recipient decrypts the encrypted passkey using a private key of the recipient and decrypts the data structure using: the passkey;
   e) a software module hashing the pseudonymous data structure using a cryptographic hash function, thereby generating a pseudonymous data hash; and
   f) a software module publishing a first transaction comprising the pseudonymous data hash to a distributed blockchain computing network for validation and addition to a data verification blockchain within a new block.

18. The device of claim 17, wherein the application further comprises a software module verifying the first electronic record by performing steps comprising:
   a) obtaining a copy of the pseudonymous data structure;
   b) hashing the pseudonymous data structure to generate a verification hash; and
   c) comparing the verification hash to the pseudonymous data hash stored on the blockchain, wherein the electronic record is verified when the verification hash and the pseudonymous data hash match.

19. The device of claim 17, wherein the application further comprises a software module anonymizing the first electronic record.

20. The device of claim 19, wherein anonymizing the electronic record comprises removing the identifying information while allowing data verification of the first electronic record, or wherein anonymizing the first electronic record comprises removing the first electronic record from the database while maintaining the pseudonymous data structure, wherein the pseudonymous data structure comprises non-identifying information and the identifying data hash.

* * * * *